(12) United States Patent
Mason et al.

(10) Patent No.: US 8,193,102 B2
(45) Date of Patent: Jun. 5, 2012

(54) PROCESS FOR DIRECTING ASSEMBLIES OF PARTICULATE DISPERSIONS USING SURFACE ROUGHNESS

(75) Inventors: Thomas G. Mason, Los Angeles, CA (US); Kun Zhao, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 181 days.

(21) Appl. No.: 12/739,697

(22) PCT Filed: Nov. 14, 2008

(86) PCT No.: PCT/US2008/012832
§ 371 (c)(1), (2), (4) Date: Apr. 23, 2010

(87) PCT Pub. No.: WO2009/064489
PCT Pub. Date: May 22, 2009

(65) Prior Publication Data
US 2010/0233436 A1     Sep. 16, 2010

Related U.S. Application Data

(60) Provisional application No. 60/996,376, filed on Nov. 14, 2007.

(51) Int. Cl.
*H01L 21/31* (2006.01)
*H01L 21/469* (2006.01)
(52) U.S. Cl. ........ 438/778; 438/478; 438/458; 438/779; 438/780
(58) Field of Classification Search .................. 438/128, 438/309, 478, 455, 456, 457, 458, 459, 778, 438/779, 780
See application file for complete search history.

(56) References Cited

U.S. PATENT DOCUMENTS

| | | |
|---|---|---|
| 6,268,222 B1 | 7/2001 | Chandler et al. |
| 6,507,981 B1 | 1/2003 | Bowden et al. |
| 7,056,840 B2 | 6/2006 | Miller et al. |
| 2005/0261417 A1 | 11/2005 | Mezzenga et al. |

FOREIGN PATENT DOCUMENTS
WO    WO-2006/096571    9/2006

OTHER PUBLICATIONS

International Search Report—PCT/US08/12832 dated Jan. 29, 2009.
Whitesides, G. M.; Grzybowski, B. *Science* 2002, 295, 2418.

(Continued)

*Primary Examiner* — Michael C Miggins
(74) *Attorney, Agent, or Firm* — Venable LLP; Henry J. Daley

(57) ABSTRACT

A method of assembling composite structures from objects in fluid includes providing a plurality of objects, each having a preselected size, shape, and spatial distribution of surface structural features characterizing a surface roughness; dispersing the objects into the fluid; and introducing a depletion agent. The depletion agent includes a plurality of particles having a size distribution preselected causing an attractive force arising from a depletion attraction between at least a first object and second object of the plurality in at least one relative position and orientation based on the preselected spatial distribution of surface structural features on the first and second objects, and the depletion attraction between the first and second objects forms at least one rigid bond or slippery bond at or proximate to respective surface portions based on the preselected spatial distribution of surface structural features on the first and second objects to form a two-object composite structure.

22 Claims, 28 Drawing Sheets

OTHER PUBLICATIONS

Antl, L.; Goodwin, J. L.; Hill, R. D.; Ottewill, R. H.; Owens, S. M.; Papworth, S.; Waters, J. A. *Colloid Surf* 1986, 17, 67.
van der Kooij, F. M.; Kassapidou, K.; Lekkerkerker, H. N. W. *Nature* 2000, 406, 868.
Murphy, C. *Science* 2002, 298, 2002, 2139.
Mokari, T.; Rothenberg, E.; Popov, 1.; Costi, R.; Banin, U. *Science* 2004, 304, 1787.
Manoharam, V. N.; Elsesser, M. T.; Pine, D. J. *Science* 2003, 301, 483.
Raviv, U.; Needleman, D. J.; Li, Y.; Miller, H. P.; Wilson, L.; Safinya, C. R. *Proc. Nat. Acad. Sci.* 2005, 102, 11167.
Dinsmore, A. D.; Hsu, M. F.; Nikolaides, M. G.; Marquez, M.; Baush, a. R.; Weitz, D. A. *Science* 2002, 298, 1006.
van Blaaderen, A., *Nature* 2006, 439, 545.
Higurashi, E.; Ukita, H.; Tanaka, H.; Ohguchi, O. *Appl. Phys. Lett.* 1994, 64, 2209.
Brown, A. B. D.; Smith, C. G.; Rennie, A. R. *Phys. Rev. E* 2000, 62, 951.
Sullivan, M.; Zhao, K.; Harrison, C.; Austin, R. H.; Megens, M.; Hollingsworth, A.; Russel, W. B.; Cheng, Z.; Mason, T. G.; Chaikin, P. M. *J. Phys. Condens. Matter* 2003, 15, S11.
Rolland, J. P.; Maynor, B. W.; Euliss, L. E.; Exner, A. E.; Denison, G. M.; DeSimone, J. M. *J. Am. Chem. Soc.* 2005, 127, 10096.
Mason, T. G. *Phys. Rev. E* 2002, 66, 60402.
Mason, T. G.; Wilking, J. N.; Meleson, K.; Chang, C. B.; Graves, S. M. *J. Phys.: Condens. Matter* 2006, 18, R635.
Liu, A. J.; Nagel, S. R. *Nature* 1998, 396, 21.
Donev, A.; Cisse, I.; Sachs, D.; Variano, E. A.; Stillinger, F. H.; Connelly, R.; Torquato, S.; Chaikin, P. M. *Science* 2003, 303, 990.
Yethiraj, A.; van Blaaderen, A. *Nature* 2003, 421, 513.
Dendukuri, D.; Pregibon, D. C.; Collo ins, J.; Hatton, T. A.; Doyle, P. S. *Nature Mater.* 2006, 5, 365.
Korda, P.; Spalding, G. C.; Dufresne, E. R.; Grier, D. G. *Rev. Sci. Instr.* 2002, 73, 1956.
Frenkel, D. *Nature Mater.* 2006, 5, 85.
Gasser, U.; Weeks, E. R.; Schofield, A.; Pusey, P. N.; Weitz, D. A. *Science* 2001, 292, 258.
Leunissen, M. E.; Christova, C. G.; Hynninen, A. P.; Royall, P.; Campbell, A. I.; Imhof, A.; Dijkstra, M.; van Roij, R.; van Blaaderen, A. *Nature* 2005, 438, 235.
Tkachenko, A. V. *Phys. Rev. Lett.* 2002, 89, 148303.
Adams, M.; Dogic, Z.; Keller, S. L.; Fraden, S. *Nature* 1998, 393, 349.
Weeks, E. R.; Weitz, D. A. *Phys. Rev. Lett.* 2002, 89, 095704.
Torquato, S.; Truskett, T. M.; Debenedetti, P. G. *Phys. Rev. Lett.* 2000, 84, 2064.
Cheng, Z.; Chaikin, P. M.; Mason, T. G. *Phys. Rev. Lett.* 2002, 89, 108303.
Y.N. Ohshima et al., Phys. Rev. Lett. 78, 3963 (1997).
D. Rudhardt, C. Bechinger, and P. Leiderer, Phys. Rev. Lett. 81, 1330 (1998).
S. Asakura, and F. Oosawa, J. Chem. Phys. 22, 1255 (1954).
S. Asakura, and F. Oosawa, J. Polym. Sci. 33, 183 (1958).
C.J. Hernandez, and T.G. Mason, J. Phys. Chem. C 111, 4477 (2007).
S. Badaire et al., J. Am. Chem. Soc. 129, 40 (2007).
J.C. Love et al., Langmuir 17, 6005 (2001).
M.D. Hoover, J. Aerosol Sci. 21, 569 (1990).
L. Manna et al., Nature Mater. 2, 382 (2003).
Z. Dogic, Phys. Rev. Lett. 91, 165701 (2003).
J.N. Wilking et al., Phys. Rev. Lett. 96, 015501 (2006).
A.D. Dinsmore et al., Phys. Rev. Lett. 96, 185502 (2006).
P. Alexandridis, and T.A. Hatton, Colloids Surf. A 96, 1 (1995).
P. Alexandridis, J.F. Holzwarthf, and T.A. Hatton, Macromolecules 27, 2414 (1994).
S.L. Nolan et al., J. Colloid Interface Sci 191, 291 (1997).
J.R. Savage et al., Science 314, 795 (2006)).
C. Casagrande et al., Europhys. Lett. 9, 251 (1989).
K. Zhao and T.G. Mason, Phys. Rev. Lett. 99, 268301 (2007).
C.R. Seager and T.G. Mason, Phys. Rev. E, 75 011406 (2007).

Example 1: Cup (Dimer) – Base and Cap having Flat Surfaces

Part 1: Circular Base

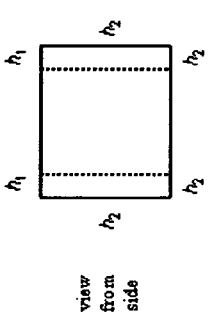

view from side

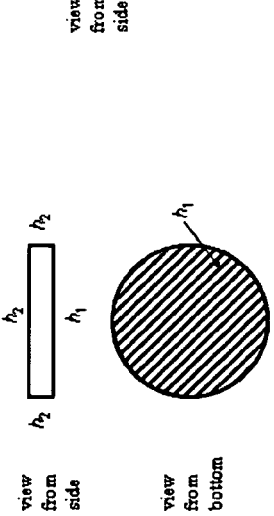

view from bottom

Part 2: Cylindrical Tube

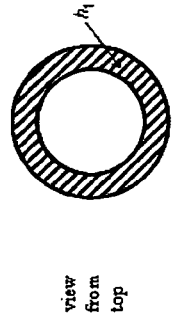

view from side

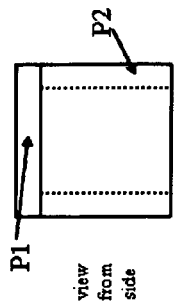

view from top

Cup (Dimer)

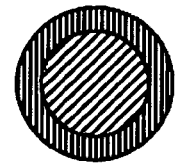

view from side

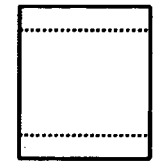

view from bottom

Characteristic surface roughnesses: $h_1 < h_2$

Combine dispersion containing a plurality of part 1 (P1) to a dispersion of part 2 (P2) so that the number of P1 is in a 1:1 ratio with the number of P2

Add sufficient volume fraction of depletion agent 1 having diameter $d_1$: $h_1 < d_1 < h_2$ to cause aggregation of cup-like dimers through roughness-controlled depletion attractions

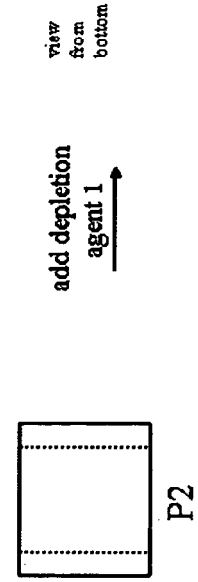

P1 + P2 →(add depletion agent 1)

Figure 18

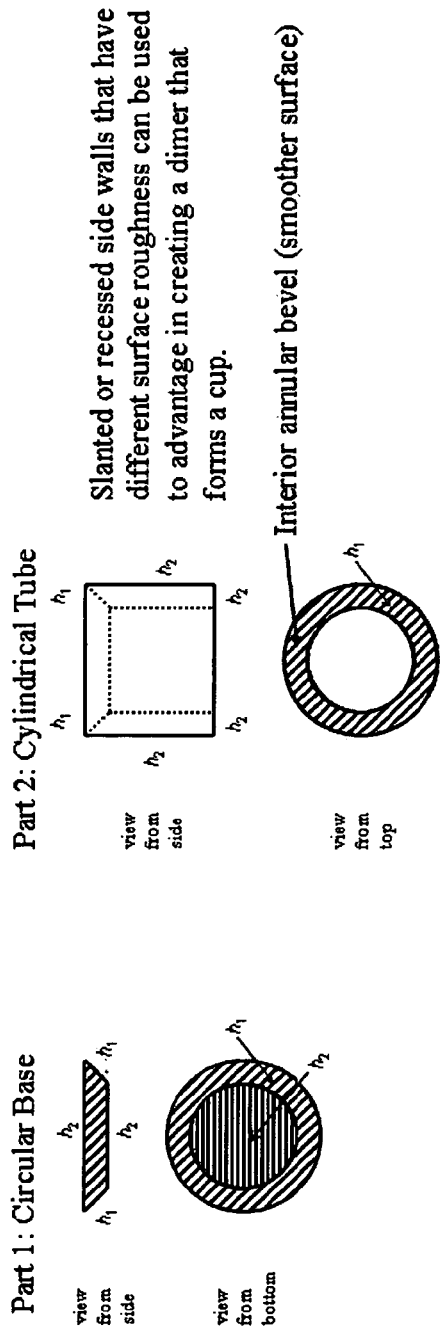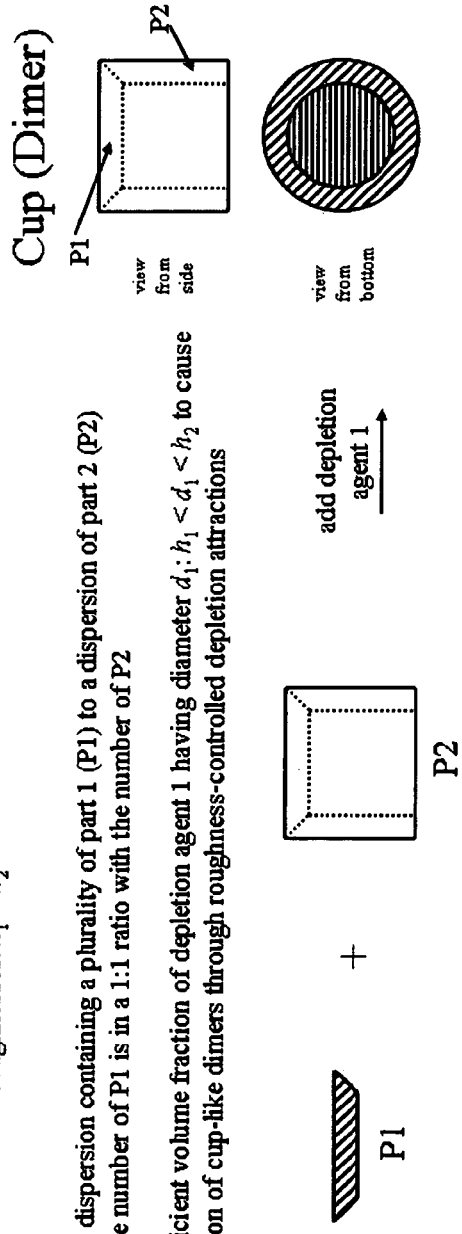
Figure 19

Example 5: Container (Trimer)- Slanted Internal Surfaces

Part 1: Circular Cap/Base    Part 2: Cylindrical Tube

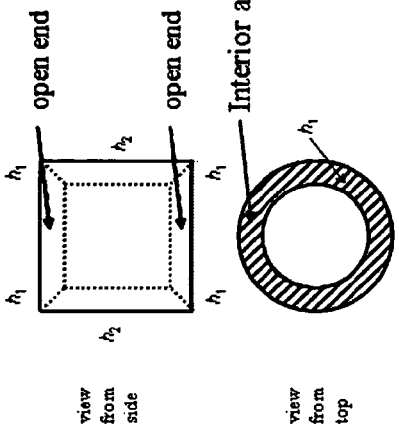

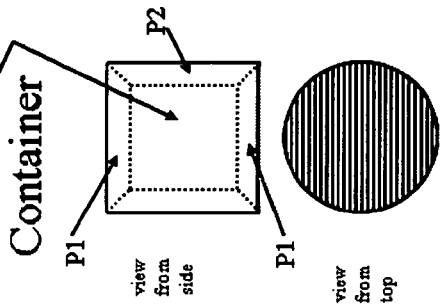

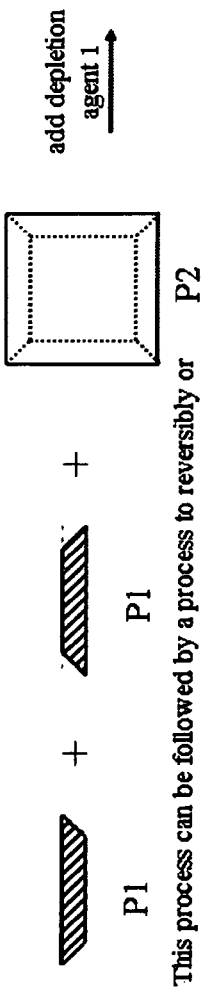

Characteristic surface roughnesses: $h_1 < h_2$

Combine dispersion containing a plurality of part 1 (P1) to a dispersion of part 2 (P2) so that the number of P1 is in a 2:1 ratio with the number of P2

Add sufficient volume fraction of depletion agent 1 having diameter $d_1$: $h_1 < d_1 < h_2$ to cause aggregation of container-like trimers through roughness-controlled depletion attractions

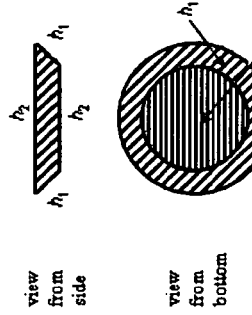

This process can be followed by a process to reversibly or permanently bond together the proximate parts.

Figure 22

Example 6: Container (Trimer) – Cap, Base, & Tube

Part 1: Circular Cap

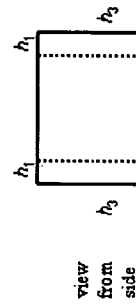
view from side

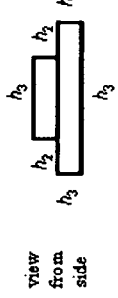
view from bottom

Part 2: Circular Base

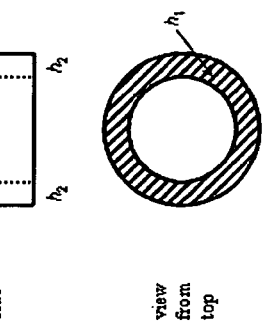
view from side

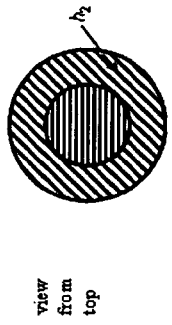
view from top

Part 3: Cylindrical Tube

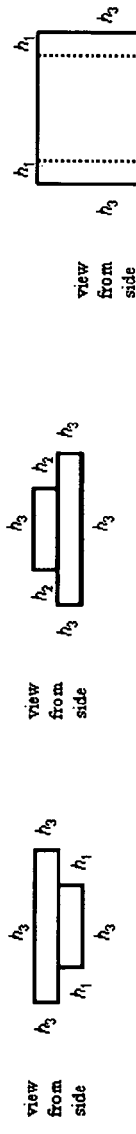
view from side

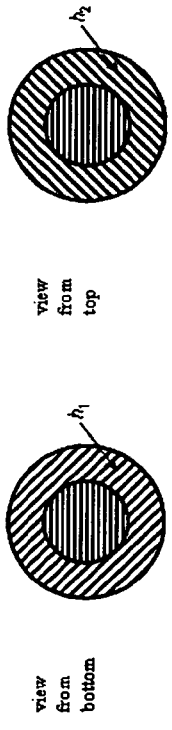
view from top

Characteristic surface roughnesses: $h_1 < h_2 < h_3$

Combine dispersions containing a plurality of part 1 (P1), part 2 (P2), and part 3 (P3) so that the numbers of P1, P2, and P3 are in a 1:1:1 ratio in the resulting dispersion.

Add sufficient volume fraction of depletion agent 1 having diameter $d_1$: $h_1 < d_1 < h_2$ to cause aggregation of cup-like dimers of P1 with P3. Then, add a sufficient volume fraction of depletion agent 2 having diameter $d_2 > d_1$, where $h_2 < d_2 < h_3$ to cause aggregation of container-like trimers of P1, P2, and P3.

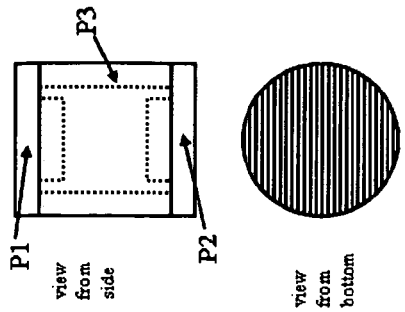

P1   +   P2   +   P3   add depletion agent 1 →   Container

This process can be followed by a process to reversibly or permanently bond together the proximate parts.

Figure 23

Example 7: Rectangular Flange (Dimer)

Part 1: Square Platelet with Smoother Patch on One Face

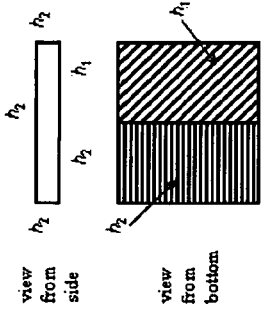

A patch with a different roughness can be made on the surfaces of particles using particle deposition, spatially patterned radiation, relief deposition templating, imprinting, etching, and other lithographic methods.

Characteristic surface roughnesses: $h_1 < h_2$
(Here, it is desirable for $h_2$ to be considerably larger than $h_1$ to inhibit formation of aligned dimers. Alternatively, a post could be placed in the $h_2$ region of the bottom side to inhibit aligned dimers.)

Given a dispersion containing a plurality of part 1 (P1)

Add sufficient volume fraction of depletion agent 1 having diameter $d_1$: $h_1 < d_1 < h_2$ to cause aggregation of flange-like dimers through roughness-controlled depletion attractions

Figure 24

Example 8: Flexible Chain (Quasi 1-dimensional multimer of a single type of part)

Part 1: Platelet (elongated) with smoother circular patches on opposite ends and a post in the middle

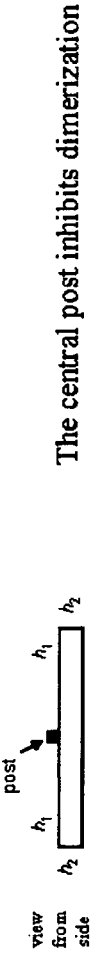

The central post inhibits dimerization of the platelets, so chains are more likely to form. The post can be omitted if $h_2$ is much larger than $h_1$.

Characteristic surface roughnesses: $h_1 < h_2$

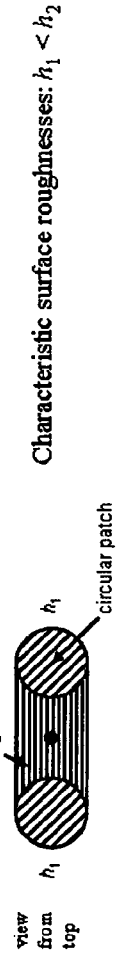
circular patch

Given a dispersion containing a plurality of part 1 (P1)

Add sufficient volume fraction of depletion agent 1 having diameter $d_1$: $h_1 < d_1 < h_2$ to cause aggregation of P1 into flexible chain-like multimers.

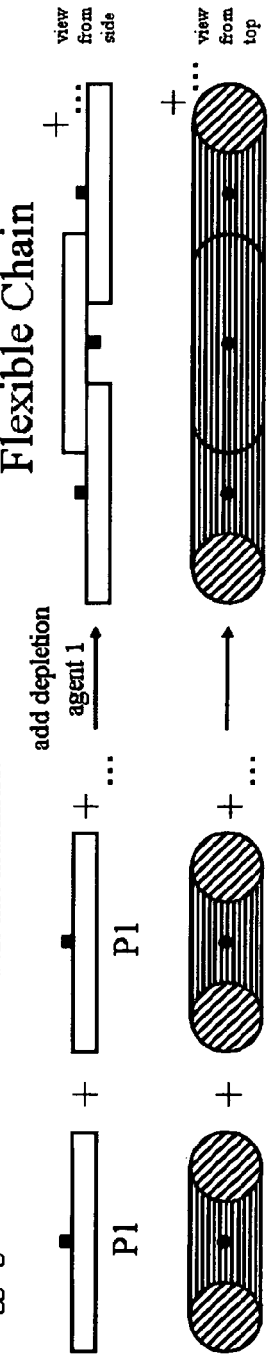

Two circular patches on different particles strongly attract when a depletion agent is present, such slippery attractions where two patches meet form a rotational hinge that can rotate freely in the flat plane of the platelet.

Figure 25

Example 9: Stepped Flexible Chain (Quasi 1-dimensional multimer)

Part 1: Platelet (elongated) with smoother circular patches on opposite ends and sides Characteristic surface roughnesses: $h_1 < h_2$

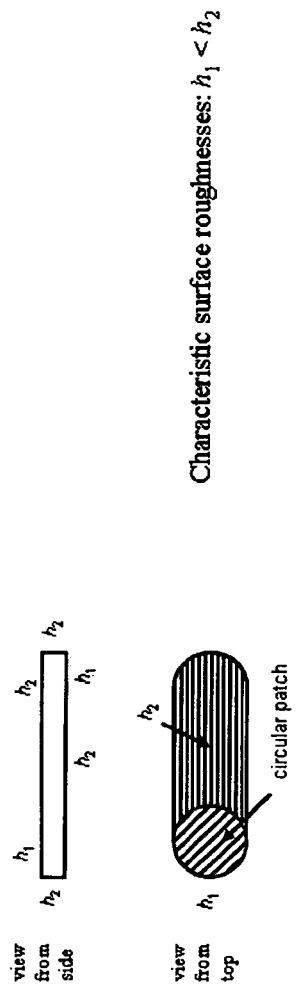

Given a dispersion containing a plurality of part 1 (P1)

Add sufficient volume fraction of depletion agent 1 having diameter $d_1$: $h_1 < d_1 < h_2$ to cause aggregation of P1 into flexible chain-like multimers.

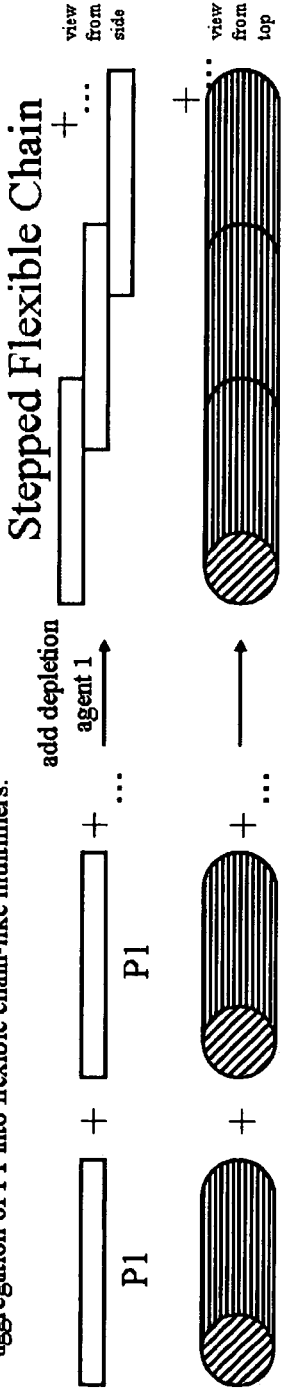

Two circular patches on different particles strongly attract when a depletion agent is present; such slippery attractions where two patches meet form a rotational hinge that can rotate freely in the flat plane of the platelet.

Figure 26

Example 10: Random Stepped Angled Chain (Quasi 1-dimensional multimer)

Part 1: Platelet (elongated) with smoother square patches on opposite ends and sides Non-circular smoother patches can be used to create interactions that inhibit free rotations of the parts, so a fixed angle of orientation of one part relative to the next can be directed.

Characteristic surface roughnesses: $h_1 < h_2$

The pitch of the helix is determined by the thickness of the particle, and the angle of the square patch relative to the rectangular body.

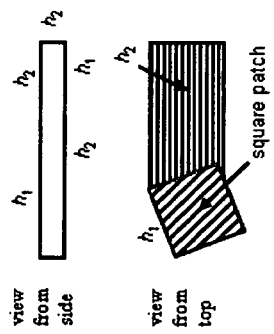

Given a dispersion containing a plurality of part 1 (P1)

Add sufficient volume fraction of depletion agent 1 having diameter $d_1$: $h_1 < d_1 < h_2$ to cause aggregation of P1 into fixed helical coil multimers.

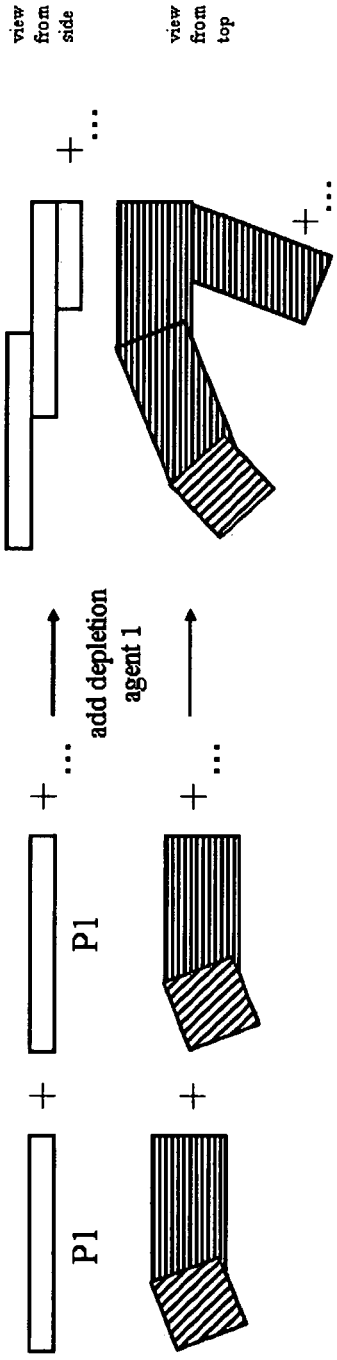

Figure 27

Example 11: Helical Coil (Quasi 1-dimensional multimer)

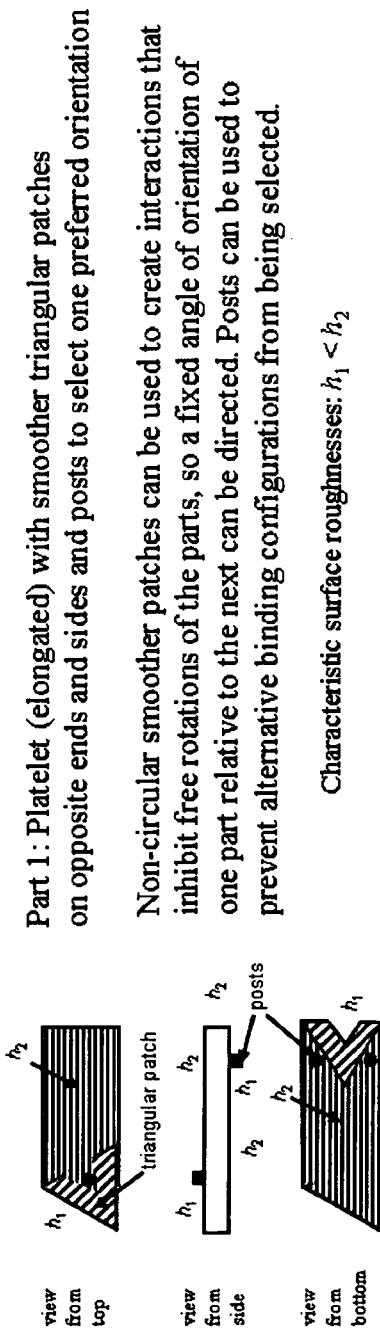

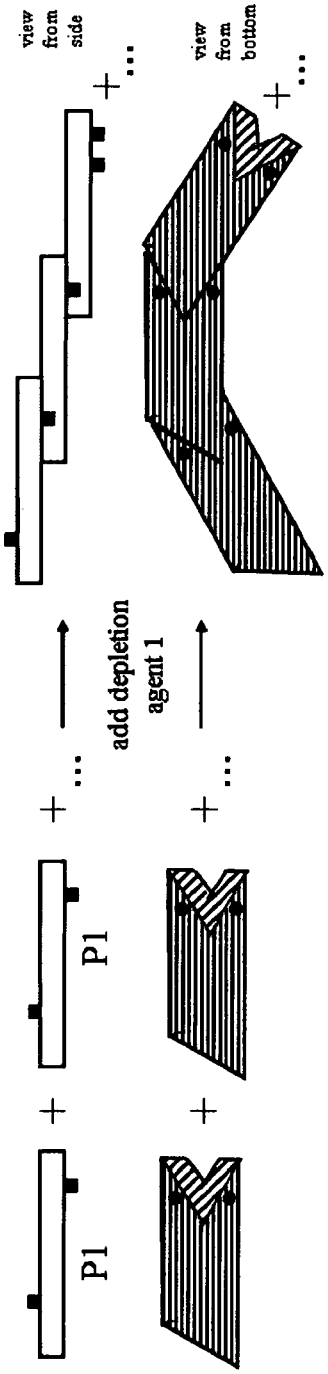

Part 1: Platelet (elongated) with smoother triangular patches on opposite ends and sides and posts to select one preferred orientation Non-circular smoother patches can be used to create interactions that inhibit free rotations of the parts, so a fixed angle of orientation of one part relative to the next can be directed. Posts can be used to prevent alternative binding configurations from being selected.

Characteristic surface roughnesses: $h_1 < h_2$

The pitch of the helix is determined by the thickness of the particle, and the angle of the square patch relative to the rectangular body.

Given a dispersion containing a plurality of part 1 (P1)

Add sufficient volume fraction of depletion agent 1 having diameter $d_1$: $h_1 < d_1 < h_2$ to cause aggregation of P1 into fixed helical coil multimers.

Figure 28

Example 12 (continued): Forming Assemblies Through a Two-Step Aggregation Process Using Roughness-Controlled Depletion Attractions

3 Wait for thermal agitation plus attraction to cause dimer aggregation

Cup-like dimers form due to the depletion attraction after waiting for agitation-driven encounters of particles to occur.

Optionally, for larger parts, an external form of non-thermal agitation could be used.

Depletion agent 1 can be present inside the cup-like dimers.

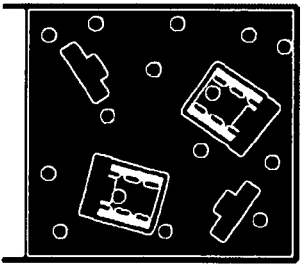

4 Add depletion agent 2 having diameter $d_2$ where $h_2 < d_2 < h_3$

• = Depletion Agent 2

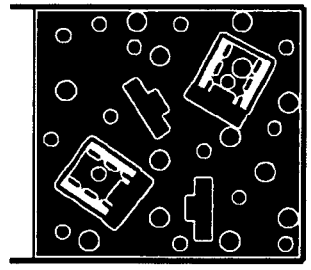

Raise volume fraction of depletion agent 2 : $\phi_{s2}$ until the attraction between dimers of (part 1 + part 2) and parts 3 significantly exceeds thermal energy, causing trimers of part 1 + part 2 + part 3 to form without creating other undesired structures.

*(this example is continued on the following page)*

Figure 30

Example 12 (continued): Forming Assemblies Through a Two-Step Aggregation Process Using Roughness-Controlled Depletion Attractions 5. Wait for thermal agitation plus attraction to cause trimer aggregation

- Container-like trimers form due to the depletion attraction after waiting for agitation-driven encounters of particles to occur.
   - Optionally, for larger parts, an external form of non-thermal agitation could be used.
   - Depletion agents 1 and 2 can be present and trapped inside the container-like trimers.

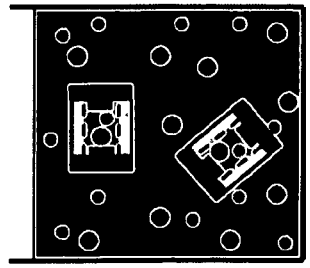

6. Optionally, the parts comprising the containers can be permanently bonded together using physical processes (e.g. heating or photo-reactive welding) and/or chemical processes (e.g. adding salt or changing pH).

Optionally, the permanently bonded containers can be separated from the depletion agents (e.g. through repeated sedimentation and resuspension).

Figure 31

PROCESS FOR DIRECTING ASSEMBLIES OF PARTICULATE DISPERSIONS USING SURFACE ROUGHNESS

CROSS-REFERENCE TO RELATED APPLICATION

This application claims priority to U.S. Provisional Application No. 60/996,376 filed Nov. 14, 2007 the entire contents of which are hereby incorporated by reference, and is a U.S. national stage application under 35 U.S.C. §371 of PCT/US2008/012832 filed Nov. 14, 2008, the entire contents of which are incorporated herein by reference.

STATEMENT REGARDING FEDERALLY SPONSORED RESEARCH OR DEVELOPMENT

This invention was made with Government support of Grant No. 0450022 awarded by the National Science Foundation. The Government has certain rights in this invention.

BACKGROUND

1. Field of Invention

The present invention relates to methods of producing composite structures, and more particularly to methods of producing composite structures directed by surface roughness and to composite structures made by the methods.

2. Discussion of Related Art

One of the primary goals of synthetic colloidal chemistry is to create new kinds of particles that have a wide variety of shapes and functionalities and overall sizes in the range from a few microns to a few nanometers. The dominant approach taken by many groups worldwide is through bottom-up synthesis, including "self-assembly" (Whitesides, G. M.; Grzybowski, B. *Science* 2002, 295, 2418) of atomic, molecular, and supramolecular components. Self-assembled structures can be simple, such as spheres (Antl, L.; Goodwin, J. L.; Hill, R. D.; Ottewill, R. H.; Owens, S. M.; Papworth, S.; Waters, J. A. *Colloid Surf* 1986, 17, 67), disks (Mason, T. G. *Phys. Rev. E* 2002, 66, 60402), platelets (van der Kooij, F. M.; Kassapidou, K.; Lekkerkerker, H. N. W. *Nature* 2000, 406, 868), and cubes (Murphy, C. *Science* 2002, 298, 2139). They can also be more complex, such as tetrapods (Mokari, T.; Rothenberg, E.; Popov, I.; Costi, R.; Banin, U. *Science* 2004, 304, 1787), clusters (Manoharam, V. N.; Elsesser, M. T.; Pine, D. J. *Science* 2003, 301, 483), liposome-microtubule complexes (Raviv, U.; Needleman, D. J.; Li, Y.; Miller, H. P.; Wilson, L.; Safinya, C. R. *Proc. Nat. Acad. Sci.* 2005, 102, 11167), and colloidosomes (Dinsmore, A. D.; Hsu, M. F.; Nikolaides, M. G.; Marquez, M.; Baush, A. R.; Weitz, D. A. *Science* 2002, 298, 1006). Random thermal forces cause colloidal particles to diffuse rapidly in a liquid regardless of their structures; this Brownian motion can overcome gravity and keep the particles dispersed homogenously over long times (Russel, W. B.; Saville, D. A.; Schowalter, W. R. *Colloidal Dispersions*; Cambridge Univ. Press: Cambridge, 1989). Despite the increasing sophistication of self-assembly approaches, including multi-step procedures, that have produced a rich variety of new structures (van Blaaderen, A. *Nature* 2006, 439, 545), no universal recipe exists for creating monodisperse colloids that have arbitrarily prescribed shapes and sizes using bottom-up approaches.

One of the current inventors has demonstrated that high-throughput automated stepper lithography can be used to generate bulk dispersions of an enormous range of desirable particle shapes having exquisite fidelity in the colloidal length scale range (See PCT/US2007/018365 filed Aug. 17, 2007 assigned to the same assignee as the current application, the entire contents of which are incorporated herein by reference). These stepper-produced lithographic particles, or "LithoParticles", can be designed to have a virtually limitless diversity of crisp monodisperse shapes that have structures well below 10 microns in lateral dimensions. By contrast to most micro-electromechanical systems (MEMS) (Madou, M. J. *Fundamentals of Microfabrication: The Science of Miniaturization,* 2nd ed.; CRC Press: Boca Raton, 2002) applications, in which the desired structures remain attached to the wafer's surface, in our application, the LithoParticle structures, created by UV-exposure and development, are completely liberated from the wafer's surface by total lift-off into a liquid. The wafers merely serve as re-useable flat substrates for making the particles. As a demonstration of the power of this approach, we have designed and fabricated "colloidal alphabet soup": a dispersion of microscale polymer LithoParticles representing all twenty-six letters of the English alphabet in a viscous liquid. Moreover, we demonstrated control over the color and internal composition of the LithoParticle letters by incorporating red, green, and blue fluorescent dyes into them. By successively coating more than one layer of resist and exposing using different masks, we have built up complex three-dimensional LithoParticles that are not limited to simple slab-like shapes and that can be used to create complex layered internal compositions. These advances represent major breakthroughs in designing model colloids over top-down efforts in micromachining (Higurashi, E.; Ukita, H.; Tanaka, H.; Ohguchi, O. *Appl. Phys. Lett.* 1994, 64, 2209; Brown A. B. D.; Smith, C. G.; Rennie, A. R. *Phys. Rev. E* 2000, 62, 951; Sullivan, M.; Zhao, K.; Harrison, C.; Austin, R. H.; Megens, M.; Hollingsworth, A.; Russel, W. B.; Cheng, Z.; Mason, T. G.; Chaikin, P. M. *J. Phys. Condens. Matter* 2003, 15, S11) and imprintation (Rolland, J. P.; Maynor, B. W.; Euliss, L. E.; Exner, A. E.; Denison, G. M.; DeSimone, J. M. *J. Am. Chem. Soc.* 2005, 127, 10096) work to which we have contributed.

We can produce high-fidelity polymeric LithoParticles by the following versatile method. Polished wafers are spin-coated first with a sacrificial layer of water-soluble polymer and subsequently with a layer of UV-sensitive photoresist [FIG. 1(a)]. The thickness of the resist layer can be controlled from about 100 nm to many microns with excellent uniformity over the entire wafer's surface (Madou, M. J. *Fundamentals of Microfabrication: The Science of Miniaturization,* 2nd ed.; CRC Press: Boca Raton, 2002). A high-throughput, robotically-automated, ultraviolet (UV), lithographic projection exposure system, or "stepper", is used to rapidly expose the photoresist at sub-micron feature-sizes (Id.). The spin-coated wafers are exposed with the mask patterns of letters or other shapes on a photomask at 5× reduction using an Ultratech i-line stepper. This exposure causes cross-linking of the polymer resist [FIG. 1(b)]. An organic developer removes the unexposed resist without dissolving the sacrificial layer; as a result, the sacrificial layer is covered with a dense array of particles [FIG. 1(c)]. By dissolving the water-soluble sacrificial layer, the particles are lifted completely off of the surface into aqueous solution [FIG. 1(d)]. Surface charges on the particles inhibit aggregation for pH >8. Once in solution, methods of surface chemistry and solvent exchange can be used to further stabilize the particles and change the liquid from aqueous to non-aqueous (Antl, L.; Goodwin, J. L.; Hill, R. D.; Ottewill, R. H.; Owens, S. M.; Papworth, S.; Waters, J. A. *Colloid Surf* 1986, 17, 67).

The details of our synthetic procedure are as follows. LithoParticles are produced by successively spin-coating two uniform layers onto five-inch polished diameter silicon wafers. Water-soluble Omnicoat (Microchem) is initially spun onto each wafer at 3,000 rpm to produce a sacrificial layer of 0.3 µm. Next, SU-8 2001 epoxy resist in cyclopentanone is laden with red, green, and blue fluorescent dyes by adding 0.0015 g each of either Nile Red, NBD-X, or 2,6-ANS (Invitrogen) to 15 mL of SU-8 and mixing thoroughly. Each of the SU-8 solutions is then spin-coated over the sacrificial Omnicoat layers at 3,000 rpm, producing a resist layer thickness of 1.0 µm. By contrast to some photoresists, crosslinked SU-8 exhibits little optical absorption in the visible spectrum and has good chemical resistance. The density of the SU-8 after baking and removing the solvent is 1.24 g/cm$^3$. A reticle-mask (Toppan) that contains all 26 letter of the English alphabet in high density (area fraction of approximately 50%) is created by electron beam lithography (MEBES) using a layout designed in L-Edit software (Tanner EDA). The lateral dimensions of a letter on the reticle are about 35 µm×20 µm. The wafers are then exposed to 365 nm light, using an Ultratech 2145 i-line stepper (5× reduction, 0.35 micron feature size, wavelength 365 nm) with an automated wafer handling system capable of 60 wafers/hour, at a power of 233 mJ/cm2 (optimized for feature fidelity). The lateral dimensions of the printed letters after 5× reduction by the stepper are 7 µm×4 µm with only a 1 µm effective "pen-width" (i.e. the width of the stroke defining the letters). We have obtained sub-micron pen-widths for other shapes using a different mask. The wafers are developed first by organic SU-8 developer using mild agitation, and then are lifted off of the wafer surfaces into aqueous solution using water-based Omnicoat developer. After lift-off, the particles are stable against aggregation in basic solutions but can begin to aggregate if the pH is changed to be acidic. Surface functionalization and surface modification chemistry, if desired, is performed on the particle surfaces at this stage, typically immediately after lift-off before any irreversible aggregation or clumping occurs. After producing three separate bottles of monodisperse red, green, and blue fluorescent microscale letters, we mix them together to form multi-colored fluorescent colloidal alphabet soup of LithoParticles in water suitable for multi-line excitation and detection using confocal microscopy.

Probing the thermally-driven dynamics of systems of many interacting particles that have interesting and varied non-spherical shapes in three-dimensions may help unlock the mysteries of self-assembly. Since fast 3-d confocal microscopy is an excellent tool for studying colloidal model systems, we have developed dispersions of colloidal LithoParticles that are compatible with confocal microscopy by incorporating red, green, and blue fluorescent dyes into the resist prior to spin-coating. We have optimized the concentrations of the dyes to provide bright fluorescence, yet these concentrations are low enough that we can still adjust the stepper's exposure to provide the necessary cross-linking that maintains the mechanical integrity of the particles. We have created separate aqueous solutions of red, green, and blue fluorescent microletters; after combining these solutions, we have used multi-wavelength excitation and detection laser scanning confocal microscopy (TCS SP2 AOBS laser-scanning microscope: Leica) with a 63× oil-immersion objective (NA 1.40) to obtain an image section of red, green, and blue colloidal alphabet soup [FIG. 2(a)]. After thresholding and cross-filtering the red, green, and blue channels, a composite image is created. Although some concepts of shape-dependent assembly of non-spherical disk-shaped particles driven by depletion attractions have been previously introduced to make columnar aggregates of microscale disks (Mason, T. G. *Phys. Rev. E* 2002, 66, 60402), a non-obvious application of depletion attractions with LithoParticles can be used to create columnar assemblies of crosses in which the arms of the crosses are highly aligned, interdigitated and angular offset aggregation of crosses, columnar tubes comprised of square donuts, lock-and-key aggregation caused by the insertions of an arm of a cross into the hole of a donut, and the formation of a cup by causing a donut to aggregate face-to-face with a cross [FIGS. 2(b)-(e)]. In all these examples, the small spheres used as a depletion agent, which create the depletion attraction between the larger objects, are nanoemulsion droplets (Mason, T. G.; Wilking, J. N.; Meleson, K.; Chang, C. B.; Graves, S. M. J. Phys.: *Condens. Matter* 2006, 18, R635) having an average radius of 57±5 nm at a droplet volume fraction of 0.1.

Due to the high resolution of the stepper, the control over the shapes of the letters is exquisite. The effective width of the pen that has written the letters is about 1.0 µm, as we intended. Scanning electron microscope (SEM) images of the letters [FIG. 3(a)] reveal a striking crispness and high degree of uniformity: the polydispersities in lengths and in thicknesses of the letters are less than 10%. These SEM images are obtained by drying particles on a Ni/Cu tape (Ted Pella Inc.) and sputtering 5 nm of gold using a Hummer 6.2 Sputterer (Anatech Ltd.) to reduce charging. Images are acquired using a field emission JEOL JSM-6700F SEM at a working distance of 8 mm and at 10 kV and 10 µA. Jamming (Liu, A. J.; Nagel, S. R. *Nature* 1998, 396, 21) and interlocking of the deposited particles is evident. Indeed, the interlocking of particles that have "arms" and "hooks" in a disordered structure is actually an unusual non-equilibrium jammed state that can support tension; simpler particle shapes, such as spheres (Torquato, S.; Truskett, T. M.; Debenedetti, P. G. *Phys. Rev. Lett.* 2000, 84, 2064) and ellipsoids (Donev, A.; Cisse, I.; Sachs, D.; Variano, E. A.; Stillinger, F. H.; Connelly, R.; Torquato, S.; Chaikin, P. M. *Science* 2003, 303, 990), which can only support compression, repulsively jam but do not interlock. In addition to letters, we have designed a variety of smaller particle shapes based on a single layer: square donuts (toroidal particles with a hole), square crosses (particles with four arms in the same plane), triangular prisms, and pentagonal prisms [see FIGS. 3(b)-(e)]. The Brownian motion of these particles in solution is very noticeable. By adapting stabilization and solvent exchange procedures (Yethiraj, A.; van Blaaderen, A. *Nature* 2003, 421, 513), one can match both the refractive index and the density of these particles in organic solvents.

The robotic automation of the stepper's exposure can be used to rapidly mass-produce bulk dispersions of LithoParticles. Five-inch wafers, exposed at one wafer per minute, yield roughly a quarter of a billion particles per minute, permitting the production of bulk dispersions. This production rate far surpasses that of other top-down methods, such as continuous-flow lithography (Dendukuri, D.; Pregibon, D. C.; Colloins, J.; Hatton, T. A.; Doyle, P. S. *Nature Mater.* 2006, 5, 365), which has reported rates of a hundred particles per second. The stepper provides massively parallel high throughput while maintaining superior alignment and exposure fidelity arising from a mechanically stable platform. By incorporating all of the equipment for making LithoParticles into a robotically automated track system, a continuous rate of $10^8$ particles per minute or more can be achieved.

Beyond incorporating fluorescent dyes into single-layer particles, we have achieved a high level of control over the internal composition of the particles and have achieved complex multi-layer structures. For instance, we have produced both fluorescent and magnetically-responsive LithoParticles by incorporating a variety of organic dyes and organically-coated nanoparticles, such as iron-oxide, into the photoresist layer prior to exposure and crosslinking. In addition, we have created complex 3-d multilayer LithoParticles by coating and exposing layers in succession using a set of reticles that represent the cross-sections of desired 3-d shape at different heights. As a simple example, we show hybrid bilayer Janus LithoParticles that have been created by exposing a lower resist layer laden with blue fluorescent dye with the square cross pattern, and then coating a second layer of resist containing red dye, aligning, and exposing with the triangular pattern [FIG. 4]. A microscopic dark field alignment system (μ-DFAS) is used by a piezoelectric feedback system to align the previously exposed wafer with the new reticle. Holographic laser tweezers can also be used to create complex 3-d colloidal structures (Korda, P.; Spalding, G. C.; Dufresne, E. R.; Grier, D. G. Rev. Sci. Instr. 2002, 73, 1956), yet the throughput and edge fidelity of the stepper-based method is much higher. Using our approach, deep-UV steppers with sub-100 nm feature sizes, could produce colloidal particles having dimensions smaller than 1 μm×0.6 μm×0.1 μm.

The high-throughput production of customizable colloidal LithoParticles by automated stepper technology may open doors for many new research directions. One very exciting area is to use confocal microscopy to study the process of thermally-driven self-assembly of differently shaped components that have controlled interactions (Frenkel, D. Nature Mater. 2006, 5, 85). In essence, we can use the power of top-down lithography to generate model dispersions of monodisperse colloidal LithoParticles, for example, that can enable us to study and understand the science of bottom-up self-assembly. This problem lies at the heart of understanding structure-function relationships in molecular biology, for example. In order for thermally driven self-assembly to occur in a reasonable time, Brownian motion of the components should be significant. Larger particles generated using other lithographic methods are not truly colloidal and may not be useful to explore self-assembly, because the extremely slow diffusion of larger structures make self-assembly studies impractical. By contrast, our single-layer and multi-layer fluorescent LithoParticles are small enough that dynamics, such as phase transitions and self-assembly, can be explored in three dimensions using fast confocal microscopy (Gasser, U.; Weeks, E. R.; Schofield, A.; Pusey, P. N.; Weitz, D. A. Science 2001, 292, 258). Indeed, deep-UV steppers could produce sub-micron LithoParticles that would diffuse and self-assemble even more rapidly.

In addition to providing model systems of complex shapes, LithoParticles can be used in a wide range of other applications. In cell biology, LithoParticles could serve as novel fluorescent probes that may be customized and adapted to study dynamic changes of microstructures inside cells. LithoParticles that have tailored surface functionalization, such as charge groups (Leunissen, M. E.; Christova, C. G.; Hynninen, A. P.; Royall, P.; Campbell, A. I.; Imhof, A.; Dijkstra, M.; van Roij, R.; van Blaaderen, A. Nature 2005, 438, 235) or DNA (Tkachenko, A. V. Phys. Rev. Lett. 2002, 89, 148303), could provide new and interesting possibilities for creating artificial interacting architectures (Frenkel, D. Nature Mater. 2006, 5, 85). Single component or multicomponent model systems of LithoParticles can be used to explore the equilibrium phase behavior and phase transitions of mixtures of non-spherical shapes (Adams, M.; Dogic, Z.; Keller, S. L.; Fraden, S. Nature 1998, 393, 349), providing a better understanding of the fundamental science of liquid crystals. LithoParticles that have arms, whether straight or curved, can jam and interlock to form unique colloidal glasses (Weeks, E. R.; Weitz, D. A. Phys. Rev. Lett. 2002, 89, 095704). By manipulating LithoParticles with laser tweezers (Cheng, Z.; Chaikin, P. M.; Mason, T. G. Phys. Rev. Lett. 2002, 89, 108303), one may be able to mark cells with a desired shape or letter. Combining top-down LithoParticles with bottom-up synthetic approaches, such as those used to form colloidosomes (Dinsmore, A. D.; Hsu, M. F.; Nikolaides, M. G.; Marquez, M.; Baush, A. R.; Weitz, D. A. Science 2002, 298, 1006) and dense clusters (Manoharam, V. N.; Elsesser, M. T.; Pine, D. J. Science 2003, 301, 483), would offer an even greater range of interesting and potentially useful morphologies.

The advent of multi-layer monodisperse LithoParticles, including Janus LithoParticles, which have feature sizes around one micron or less, represents an important advance in lithographic colloidal dispersions. Colloidal LithoParticles exhibit significant Brownian motion and provide building blocks suitable for use in thermodynamic self-assembly driven by selective interactions, such as depletion attractions, and thermal diffusion. We have demonstrated controlled production of toroidal particles and shape-specific lock-and-key assembly. Moreover, single-layer and multi-layer particles can be made from a great range of materials, including organic, inorganic, and metallic materials.

Entropic depletion attractions have been used to cause aggregation of simple particulate dispersions (Y. N. Ohshima et al., Phys. Rev. Lett. 78, 3963 (1997); D. Rudhardt, C. Bechinger, and P. Leiderer, Phys. Rev. Lett. 81, 1330 (1998); S. Asakura, and F. Oosawa, J. Chem. Phys. 22, 1255 (1954); S. Asakura, and F. Oosawa, J. Polym. Sci. 33, 183 (1958)). More recently, it has been possible to create a variety of dispersions of particles having custom-designed shapes (C. J. Hernandez, and T. G. Mason, J. Phys. Chem. C 111, 4477 (2007); S. Badaire et al., J. Am. Chem. Soc. 129, 40 (2007); D. Dendukurl et al., Nature Mater. 5, 365 (2006); J. P. Rolland et al., J. Am. Chem. Soc. 127, 10096 (2005); M. Sullivan et al., J. Phys. Condens. Matter 15, s11 (2003); J. C. Love et al., Langmuir 17, 6005 (2001); A. B. D. Brown, C. G. Smith, and A. R. Rennie, Phys. Rev. E 62, 951 (2000); M. D. Hoover, J. Aerosol Sci. 21, 569 (1990); L. Manna et al., Nature Mater. 2, 382 (2003)). When combined with particles having complex shapes, depletion attractions provide a promising route for creating complex colloidal assemblies (T. G. Mason, Phys. Rev. E 66, 060402 (2002)). Nanoscale colloids, known as depletion agents, can induce depletion attractions between larger non-spherical particles to create complex equilibrium phases (M. Adams et al., Nature 393, 349 (1998)), shape-dependent aggregation (T. G. Mason, Phys. Rev. E 66, 060402 (2002)), and multi-step hierarchical assembly dynamics (T. G. Mason, Phys. Rev. E 66, 060402 (2002); Z. Dogic, Phys. Rev. Lett. 91, 165701 (2003)) in solution. Entropic depletion attractions between colloidal particles are ubiquitous and arise solely from physical considerations of excluded volume. Larger colloidal particles dispersed in a liquid can aggregate when a sufficient concentration of a smaller depletion agent is added (S. Asakura, and F. Oosawa, J. Chem. Phys. 22, 1255 (1954); S. Asakura, and F. Oosawa, J. Polym. Sci. 33, 183 (1958)). As both larger and smaller colloids diffuse in the liquid, the smaller colloids exert an osmotic pressure, $\Pi$, on the surfaces of the larger particles. When two larger particles nearly touch, the smaller colloids can become excluded from the region in between them, creating an attractive force due to an imbalance $\Pi$. This attractive force is very short in range, corresponding to the diameter, d, of the depletion agent. For large enough volume fractions, $\phi_s$, of the smaller depletion agent, the maximum depth of the potential energy well can become significantly larger than thermal energy, $k_B T$, leading to slippery diffusion-limited aggregation and even gelation of the larger colloids (J. N. Wilking et al., Phys. Rev. Lett. 96, 015501 (2006); A. D.

Dinsmore et al., Phys. Rev. Lett. 96, 185502 (2006)). For smooth, spherical colloids, there is good agreement between the classic theoretical predictions and experiments (Y. N. Ohshima et al., Phys. Rev. Lett. 78, 3963 (1997); D. Rudhardt, C. Bechinger, and P. Leiderer, Phys. Rev. Lett. 81, 1330 (1998)). However, there remains a need for improved methods of assembling objects dispersed in a fluid including using surface roughness to direct the assembly of the objects.

SUMMARY

A method of assembling a composite structure from objects in a fluid according to an embodiment of the current invention includes providing a plurality of objects, each object of the plurality of objects having a preselected size, a preselected shape, and a preselected spatial distribution of surface structural features characterizing a surface roughness; dispersing the plurality of objects into the fluid; and introducing a depletion agent into the fluid. The depletion agent includes a plurality of particles having a size distribution preselected to cause an attractive force arising from a depletion attraction between at least a first object and a second object of the plurality of objects in at least one relative position and orientation based on the preselected spatial distribution of surface structural features on the first and second objects, and the depletion attraction between the first and second objects forms at least one of a rigid bond or a slippery bond at or proximate to respective surface portions based on the preselected spatial distribution of surface structural features on the first and second objects to form a two-object composite structure. Composite structures according to an embodiment of the current invention are produced according to methods of production according to embodiments of the current invention.

A system for producing composite structures from objects dispersed in a fluid according to an embodiment of the current invention has a supply of a plurality of objects to be dispersed into the fluid, each object of the plurality of objects having a preselected spatial distribution of surface structural features characterizing a surface roughness; a supply of a depletion agent to be introduced into the fluid, the depletion agent comprising a plurality of particles having a size distribution preselected to cause depletion attraction between at least a first object and a second object of the plurality of objects in an orientation based on the preselected spatial distribution of surface structural features, wherein the first and second objects form at least one of a rigid bond or a slippery bond at or proximate to respective surface portions based on the preselected spatial distribution of surface structural features to form a two-object composite structure.

BRIEF DESCRIPTION OF THE DRAWINGS

Additional features of this invention are provided in the following detailed description of various embodiments of the invention with reference to the drawings. Furthermore, the above-discussed and other attendant advantages of the present invention will become better understood by reference to the detailed description when taken in conjunction with the accompanying drawings, in which:

FIG. 1 is a schematic illustration showing a sequence for mass-producing lithographic colloids in solution using automated stepper exposure that can be used as objects for assembling composite structures according to an embodiment of the current invention.

FIG. 3 shows Scanning electron micrographs of LithoParticles (white scale bars represent 3 μm).

FIG. 4 shows hybrid bilayer Janus LithoParticles resulting from double exposure using square cross and triangle masks successively (edge length of the triangles is 2.7 μm).

FIG. 6 shows surface roughness-controlled depletion attractions between plate-like particles according to an embodiment of the current invention.

FIG. 7 shows an example of turning on depletion attractions using temperature T to increase the diameter d of the depletion agent according to an embodiment of the current invention. The depletion agent is a pluronic co-polymer (P103 by BASF) at 3.75% by mass ($\phi_s$≈9%). Scale bars of optical micrographs are 5 µm.

FIG. 8 shows an example of controlling the structure of depletion aggregates by tailoring site-specific surface roughness according to an embodiment of the current invention. 'Janus' platelets are roughened to a higher degree on only one face by binding silica nanospheres (diameter D=75 nm) prior to lift-off from the wafer. Scanning electron micrographs show.

FIG. 9 contains schematic illustration to explain how asperities can influence the excluded volume (light) of the depletion agent (dark circles) between platelets according to embodiments of the current invention.

FIG. 18 is an example of a composite structure and method of production according to an embodiment of the current invention.

FIG. 19 is an example of a composite structure and method of production according to another embodiment of the current invention.

FIG. 22 is an example of a composite structure and method of production according to another embodiment of the current invention.

FIG. 23 is an example of a composite structure and method of production according to another embodiment of the current invention.

FIG. 24 is an example of a composite structure and method of production according to another embodiment of the current invention.

FIG. 25 is an example of a composite structure and method of production according to another embodiment of the current invention.

FIG. 26 is an example of a composite structure and method of production according to another embodiment of the current invention.

FIG. 27 is an example of a composite structure and method of production according to another embodiment of the current invention.

FIG. 28 is an example of a composite structure and method of production according to another embodiment of the current invention.

FIGS. 29-31 each provide examples of composite structures and methods of production according to alternative embodiments of the current invention.

DETAILED DESCRIPTION OF VARIOUS EMBODIMENTS

Figures 1A, 1B, 1C, 1D:
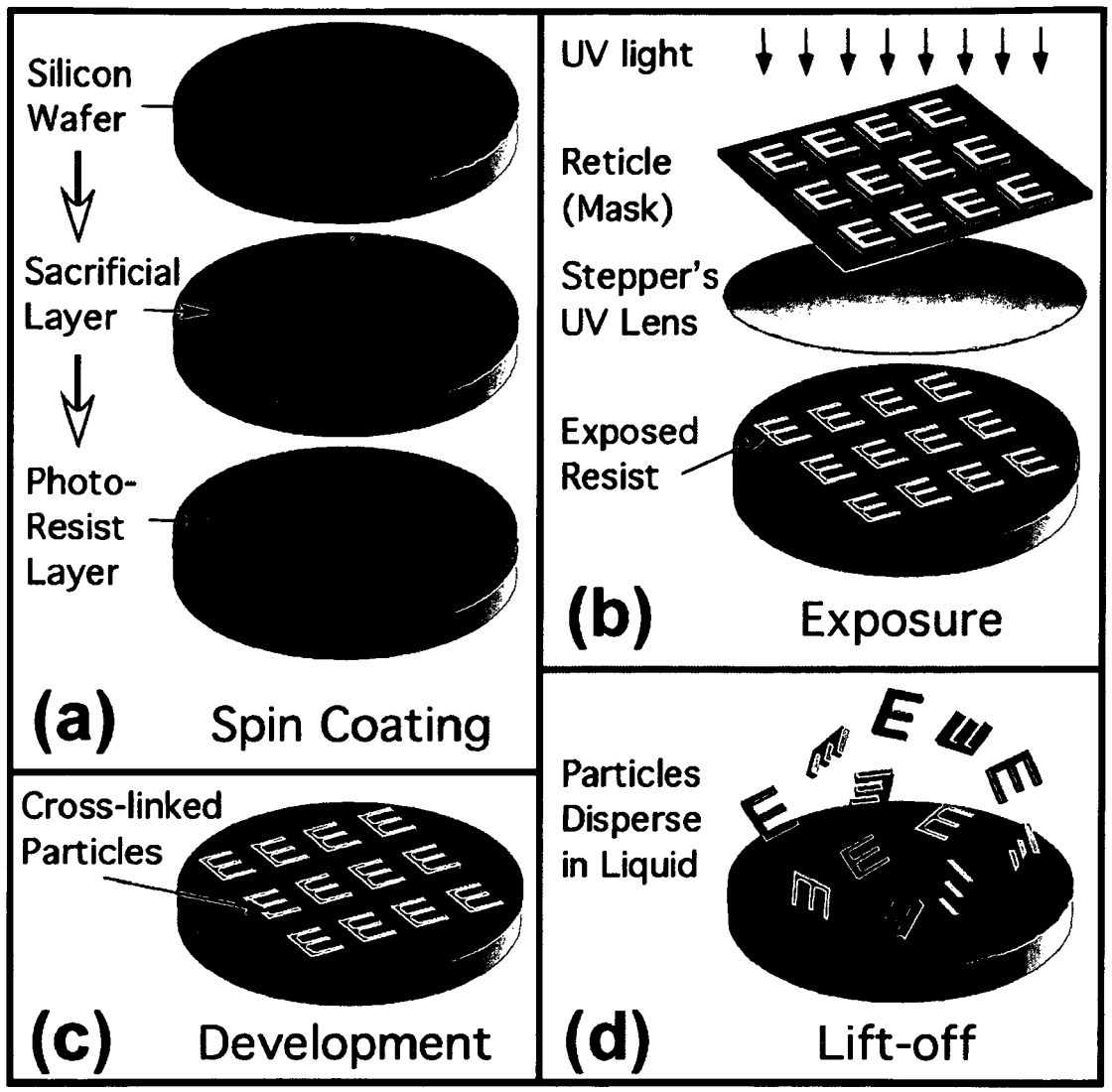
FIG. 1(a) shows spin coating of the sacrificial layer and the polymer resist layer onto a silicon wafer.
FIG. 1(b) Shows exposure: high density repeating patterns of particle shapes on the reticle (i.e. mask) are imaged by a stepper's lens onto the resist layer using ultraviolet light, thereby crosslinking the resist.
FIG. 1(c) Shows development of the resist removes the uncrosslinked regions.
FIG. 1(d) shows lift-off: dissolving the sacrificial layer liberates the particles into liquid solution.

All references cited anywhere in this specification are hereby incorporated by reference.

One of the key frontiers in mass-producing three-dimensional devices at the microscale and nanoscale is being able to manipulate and assemble constituent components reliably and in parallel. Making useful assemblies out of an array of building blocks is quite a challenging prospect. One method that could achieve this is by using shape-dependent depletion attractions to cause thermally dispersed components to assemble (i.e., aggregate) in a controlled manner. (See PCT/US2008/001443 filed on Feb. 4, 2008 and published under WO 2008/097502 on Aug. 14, 2008 assigned to the same assignee as the current application, the entire contents of which is hereby incorporated by reference herein.) Shape-specific attractive interactions between solid particles that are dispersed in liquid solutions can be controlled to assemble differently shaped components into microscale and nanoscale composites. By introducing an agent that creates an attraction between components that has a strength that depends on the relative alignment and shapes of the components, as well as the concentration of the agent, it is possible to direct the aggregation of particulate components in a process of building up a complex device. These particulate components may be dispersions of single- and multi-component lithographically designed colloids, or they may be dispersions of particles created through bottom-up synthetic processes. To make assemblies of components in parallel simply by mixing together dispersions of the parts (shape-designed particles) in a viscous liquid and then controlling attractive interactions between them would provide a powerful means of mass-production that would go far beyond manipulation of individual components.

The inventor's previous research on mixtures of polydisperse microdisks and microspheres in an aqueous surfactant solution has revealed that a depletion attraction can be used to cause shape-selective aggregation of only the microdisks into columnar aggregates, leaving the microspheres unaggregated (T. G. Mason, Phys. Rev. E 66, 060402 (2002)). The depletion attraction is a well-known short-range entropically driven interaction. The strength of the depletion interaction is proportional to the excluded volume of smaller objects between two adjacent surfaces of larger particles that are nearly touching, so the attraction is much stronger between flat surfaces than between mismatched curved surfaces. Thus, by controlling the concentration of the depletion-agent (i.e. smaller objects), one can cause disks to preferentially aggregate into columnar stacks, whereas spheres in the same solution remain dispersed. As the columnar stacks grow, their side-by-side depletion attraction becomes strong enough to overcome thermal energy and cause the stacks to aggregate into bundles. For microscale components, the depletion attraction can be created through a wide variety of additives to the solution. These depletion-creating agents include, but are not limited to: surfactant micelles, polymers, nanoscale particulates, nanoemulsions, and other small nanoscale structures or combinations thereof. In particular, the depletion-creating agent typically has a maximum dimension that is much less than the characteristic dimensions of the larger particles.

Figures 2A, 2B, 2C, 2D, 2E:
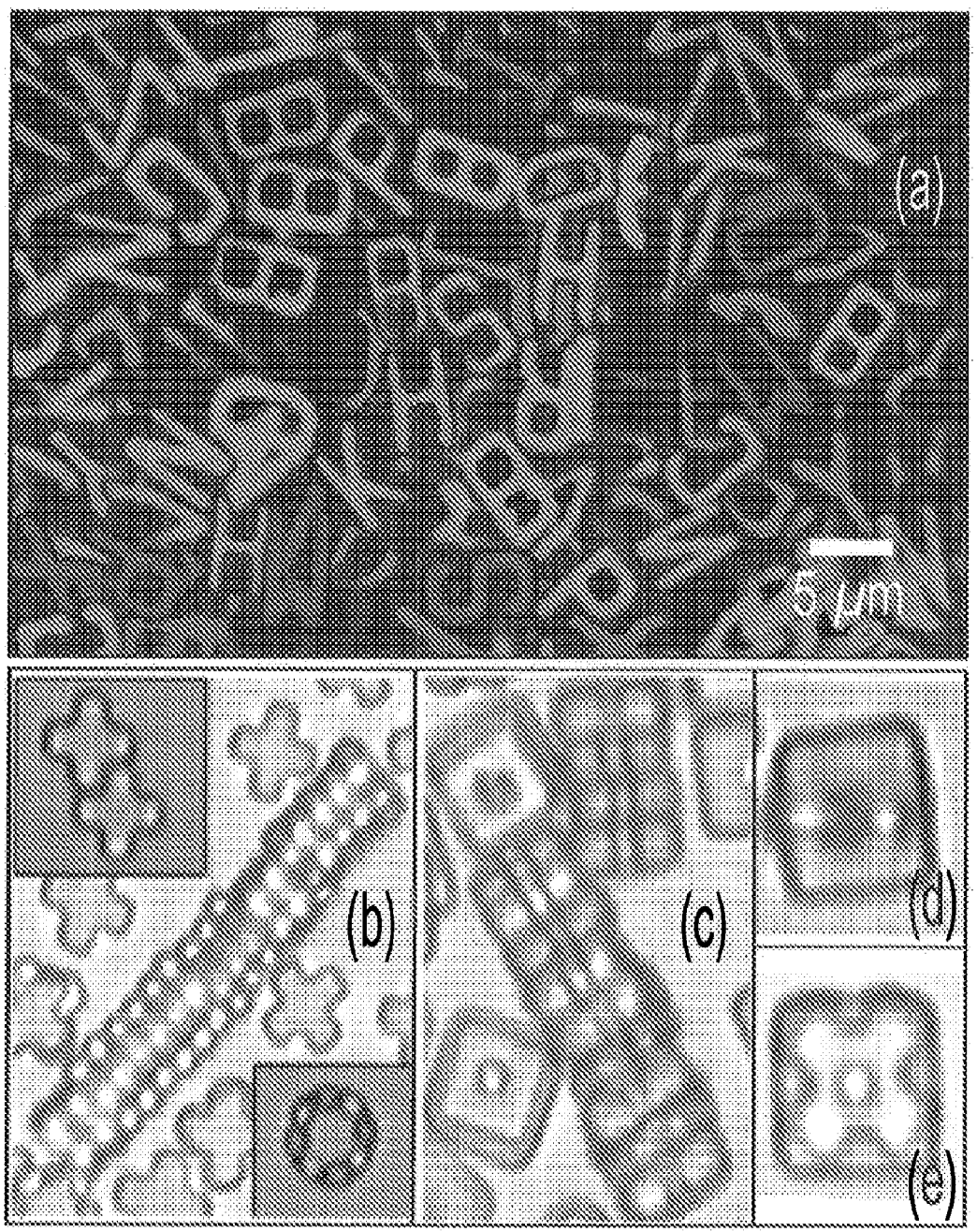
FIG. 2(a) shows a fluorescence micrograph section of multi-color "colloidal alphabet soup": an aqueous dispersion of lithographically designed colloids, or "LithoParticles", that contain red, green, and blue fluorescent dyes.
FIG. 2(b) shows depletion-induced assembly of colloidal crosses to form columns with a high correlation of arm alignment. Insets: side-to-side arm interdigitation locking (upper left), and face-to-face with 45 degree offset (lower right).
FIG. 2(c) shows assembly of long columnar tubes comprised of donut particles.
FIG. 2(d) shows lock-and-key insertion of the arm of a cross into the hole of a donut.
FIG. 2(e) shows a cup formed by a donut aggregating face-to-face with a cross.
Figures 3A, 3B, 3C, 3D, 3E:
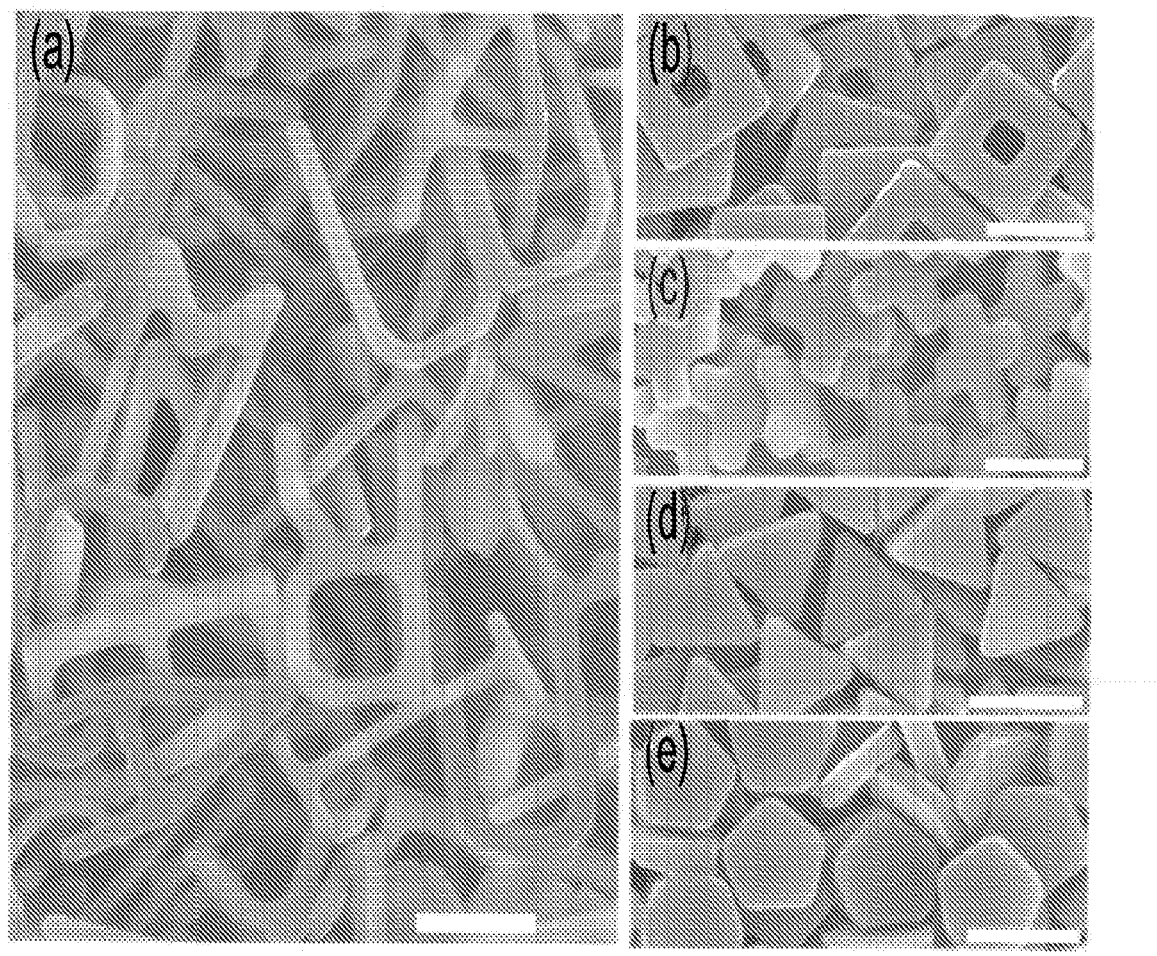
FIG. 3(a) English letters (highlights have been added).
FIG. 3(b) Square donuts.
FIG. 3(c) Square crosses.
FIG. 3(d) Triangular prisms.
FIG. 3(e) Pentagonal prisms.

One can tailor the shapes of the particles and the strength of a depletion attraction to effectively control multi-stage aggregation in order to create useful assemblies of particles. The depletion attraction can be adjusted continuously through the concentration and size of a nanoscale additive. We have created microscale lock-and-key particles of square crosses inserting an arm into the hole in square donuts (see FIG. 2 in Hernandez and Mason, J. Phys. Chem. C 111 4477-4480 (2007)). It is possible to assemble complex devices of many shape-designed components in a hierarchical multistage aggregation process, reminiscent of the assembly of certain biomolecules. For instance, tubulin proteins form dimers and then the dimers aggregate to form tubules having long persistence lengths; these tubules result from a multistage aggregation process that has very complex dynamics. Undoubtedly, the process of growth of the tubules involves more complicated interactions than geometrically governed depletion attractions, yet it serves as an inspiring example of hierarchical aggregation.

Figure 5:
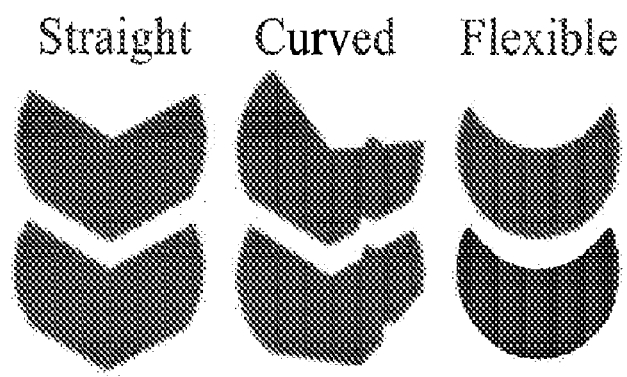
FIG. 5 shows some examples of cross-sectional areas of thin plate-like objects or longer rod-like objects having mating surface regions and complementary mating surface regions according to some embodiments of the current invention.

For instance, chevrons (FIG. 5) will assemble through the depletion attraction when nanoemulsions are added to the solution. By raising the micelle concentration to increase the depletion attraction, the individual particles will assemble columnar stacks and then the long stacks will assemble head-to-tail to form sheets. Using microscopy, one can measure the time scales associated with the stack formation and the linking of these stacks into sheets; thus, there is a dynamical process of multistage assembly driven by thermal diffusion of the particles in the presence of short-range interparticle attractions that can be anisotropic in strength and depend upon the relative position and orientation of the particles. By varying the particle shape (e.g. the angle of the head with respect to the tail) it can be possible to create straight sheets, curved sheets, or even flexible sheets.

One can control the strength of the depletion attraction by designing particles that have flat or curved surfaces, for example. Mating curved surfaces that are smooth can yield depletion attraction strengths that are proportional to the mating surface area. One simple method for controlling the order of the assembly of different components would be to use only one depletion-agent, and continuously increase the concentration of this agent. When the concentration is low, only two mating parts that have the largest smooth mating surface areas would aggregate together. If the ratio of components has been properly adjusted, the depletion attraction, which is much larger than thermal energy, causes only these components (i.e. larger objects) to come together (i.e. aggregate) in a prescribed way with a high degree of reliability and specificity of relative position and orientation. When the concentration of the depletion-agent is further raised, then another larger object can be induced to aggregate onto a smaller mating smooth area. This process can be continued in order to force the aggregation to occur in a completely prescribed manner in a sequence of aggregation steps or "stages". An advantage of this is that many identical devices could be assembled in parallel: one could literally assemble billions of devices simultaneously in solution simply by controlling the component shapes and roughness and then just slowly ramping up the concentration of the depletion-agent. In a variation of this method, a second different depletion agent that has a different size and shape than a first depletion agent could be added to the fluid to effectively cause a second stage of aggregation after a first stage of aggregation created by a first depletion agent. Repeating this process can yield a plurality of one or more desired composite structures comprised of the larger objects that have been aggregated in desired relative positions and orientations. These relative positions and orientations can be dictated by the placement of mating surface regions and complementary mating surface regions on the surfaces of the larger objects. This placement of the mating surface regions and complementary mating surface regions can be facilitated by the use of lithographic methods to design and fabricate the larger objects. In yet another variation of this method, the volume fraction of the depletion agent, the size of the depletion agent, or a combination thereof can be manipulated by changing the temperature over a prescribed range to cause a sequential or step-wise aggregation of larger objects into a plurality of one or more desired composite structures.

One can also control the strength of the depletion attraction by designing particles that have particular surface roughness features. By increasing the roughness of the surface to be comparable to the size of the depletion-agent, for example, one can eliminate the depletion attraction between other surfaces according to some aspects of the current invention. Hierarchical multi-stage assembly can arise from slippery depletion attractions between non-spherical colloids (T. G. Mason, Phys. Rev. E 66, 060402 (2002)). In surfactant micellar solutions, wax microdisks having molecularly smooth faces aggregate face-to-face into columnar stacks. The face-to-face depletion attraction energy at contact between two platelets is $U_{ff}=-V_e\Pi=-(Ad)\Pi$, where $V_e$ is the excluded volume and A is the area of a face. For spherical depletion agents, $\Pi=6\phi_s k_B T/(\pi d^3)$, and $U_{ff}$ is (T. G. Mason, Phys. Rev. E 66, 060402 (2002)):

$$U_{ff}(\phi_s, d) = -\left(\frac{6A}{\pi d^2}\right)\phi_s k_B T. \quad (1)$$

Empirically, for $\phi_s$, such that $U_{ff}/k_B T>3$, isolated columns of disks form and ultimately grow long enough that the side-side interactions between long columns also becomes larger than several $k_B T$, causing side-by-side bundling of the columns. Hierarchical aggregation also occurs for rod-like particles (Z. Dogic, Phys. Rev. Lett. 91, 165701 (2003)), although the specific sequence, involving sheets of rods that then unite to form smectic layers, is different.

To explore beyond molecularly smooth particles, we lithographically fabricate polymeric pentagonal platelets out of a clear epoxy photoresist (SU-8) using an i-line Ultratech XLS 5:1 reduction stepper (C. J. Hernandez, and T. G. Mason, J. Phys. Chem. C 111, 4477 (2007)). These monodisperse pentagons are 1 μm thick, have 1.8 μm edge lengths, and are stabilized against aggregation in aqueous solution by N-(trimethoxysilylpropyl)-ethylenediamine, triacetic acid trisodium salt. Micelles of sodium dodecylsulfate (SDS) (d=4 nm), fractionated nanoemulsion droplets (d=130±10 nm-SDS stabilized) (T. G. Mason et al., J. Phys.: Condens. Matter 18, R635 (2006)), and various sizes of monodisperse polystyrene (PS) spheres (20 nm≦d≦140 nm; sulfate stabilized) are used as depletion agents. We mix the depletion agent with a dilute particle dispersion to set $\phi_s$, and the plate-like pentagon particle volume fraction $\phi_l$, seal the mixture into rectangular microcapillaries, inhibit sedimentation by reorienting the capillaries, and wait at least 24 hours (over ten times the diffusive doubling period) to ensure that any aggregation, if present, will be detected. To reduce the complexity associated with rapid aggregation, we keep $\phi_l<<<1$ (typically $10^{-4}<\phi_l<10^{-3}$). Debye screening lengths associated with charged depletion agents are only a few nanometers and are neglected for simplicity. Atomic force microscopy reveals that the natural distribution of surface structural features on the faces of the platelets having a range of nanoscale asperity heights (FIGS. 6(a) and 6(b)). An average of the asperity height distribution is h=17±7 nm; a few taller asperities having heights around 30 nm are present.

Optical microscopy observations at different $\phi_s$ and d/h reveal boundaries associated with aggregation. For d/h<1, the platelets remain unaggregated (FIG. 6(c)). For d/h>1 and sufficiently high $\phi_s$, we find 'lateral' aggregate structures (FIG. 6(d)). The platelets do not form columns but instead are attracted face-to-face, yet with their centers highly offset laterally. For d/h well above unity, long columnar stacks of platelets form (FIG. 6(e)). Within the columns, pentagons tend to align with their points in the same direction, yet rotational dynamics can sometimes be seen within an individual column, since the energy cost to rotate two pentagons out of alignment is calculated to be less than $k_B T$. These columns, when long enough, can also aggregate side-to-side, forming bundles.

Figures 6A, 6B, 6C, 6D, 6E, 6F:
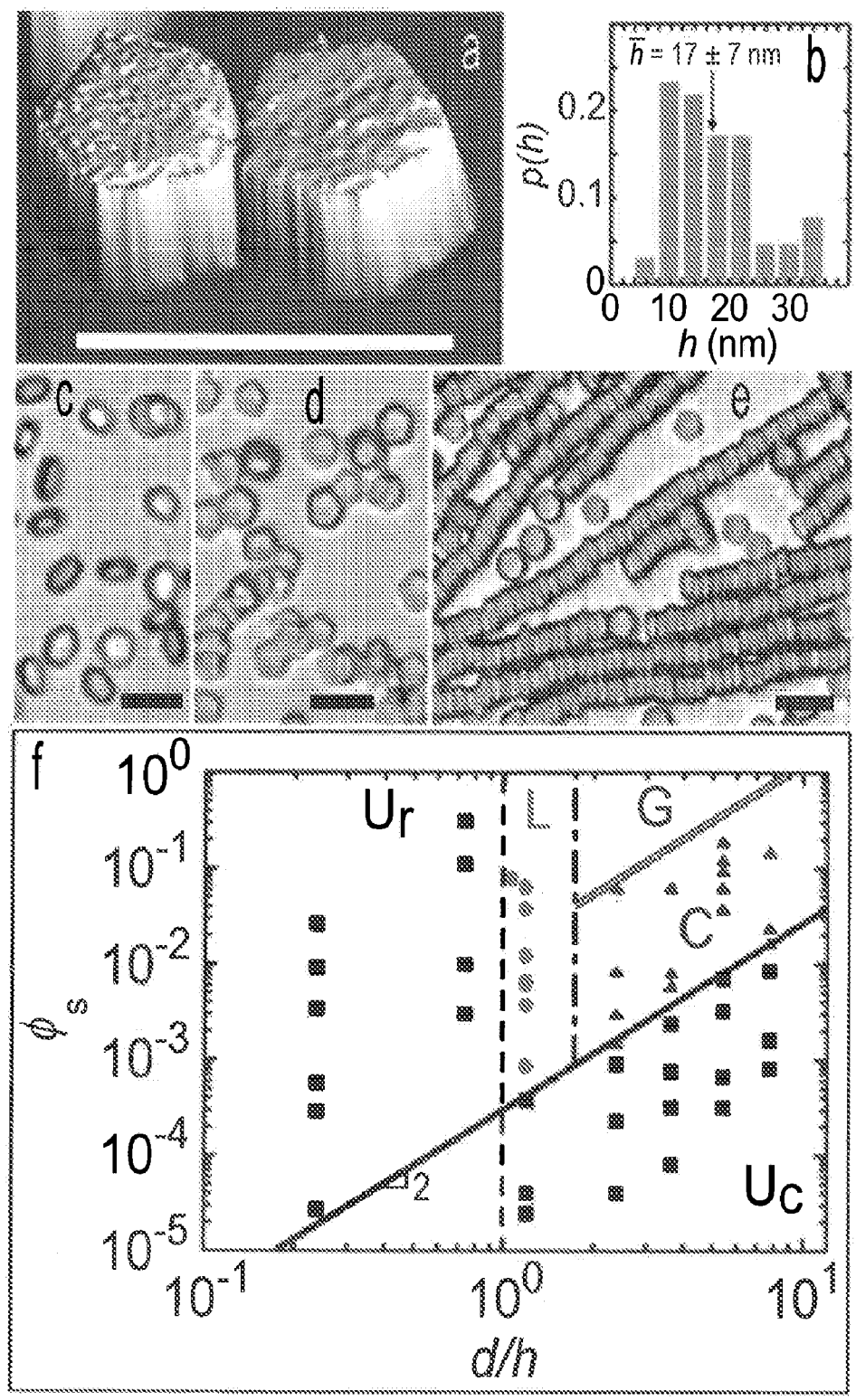
FIG. 6(a) shows atomic force micrographs that reveal a distribution of asperities on the flat faces of the pentagons.
FIG. 6(b) shows probability distribution of asperity heights p(h) has an average: h=17±7 nm.
FIG. 6(c) shows that pentagonal polymer platelets in dilute aqueous solution remain unaggregated when the diameter d of the depletion agent is smaller than the average asperity height h (SDS at 20 mM: d=4 nm, $\phi_s$=0.35%). Bars are 5 μm.
FIG. 6(d) shows that lateral aggregation of platelets occurs when d/h just exceeds unity (PS spheres: d=20 nm, $\phi_s$=0.067).
FIG. 6(e) shows that long columnar aggregates are observed for larger d/h and (nanoemulsion: d=130 nm, $\phi_s$=0.15).
FIG. 6(f) shows a universal aggregation diagram of particles having rough facets at dilute volume fractions of plate-like particles $\phi_l$. No aggregation occurs for d/h<1 (region $U_r$), nor below the solid line of constant attractive energy, $U_{ff}/(k_BT)$=10 ($U_c$) (black squares). Lateral aggregates (L) are observed for d/h≈1 (red circles). Long columns of platelets (C), including side-by-side bundles and T-structures of columns, form at higher $\phi_s$ and d/h (blue triangles). A disordered gel-like structure (G) of platelets can occur at even larger $\phi_s$, and d/h.

From these observations, we create a diagram for roughness-controlled depletion attractions between platelets (FIG. 6(f)). When asperities are tall (region $U_r$), smaller depletion agents can still diffuse between faces and inhibit aggregation. However, for d>h, the excluded volume relative to $k_B T$ becomes large, leading to lateral and columnar aggregation (regions L and C, respectively). Only a relatively small areal density of asperities having h>d on one of the surfaces is necessary to dramatically reduce the excluded volume and hence strength of the depletion attraction between the surfaces. The solid line, $\phi_s\sim(d/h)^2$ corresponds to $U_{ff}\approx10k_B T$ for smooth faces from equation (1); the true aggregation criterion is closer to $3k_B T$, since asperities will tend to reduce $U_{ff}$ from this ideal limit. Below the solid line (region $U_c$), $\phi_s$ is too low for aggregation to occur. T-like configurations of short columns and even highly disordered gels (region G) occur at very large $\phi_s$, where side-side and side-face potentials also significantly exceed $k_B T$.

Figures 7A, 7B, 7C:
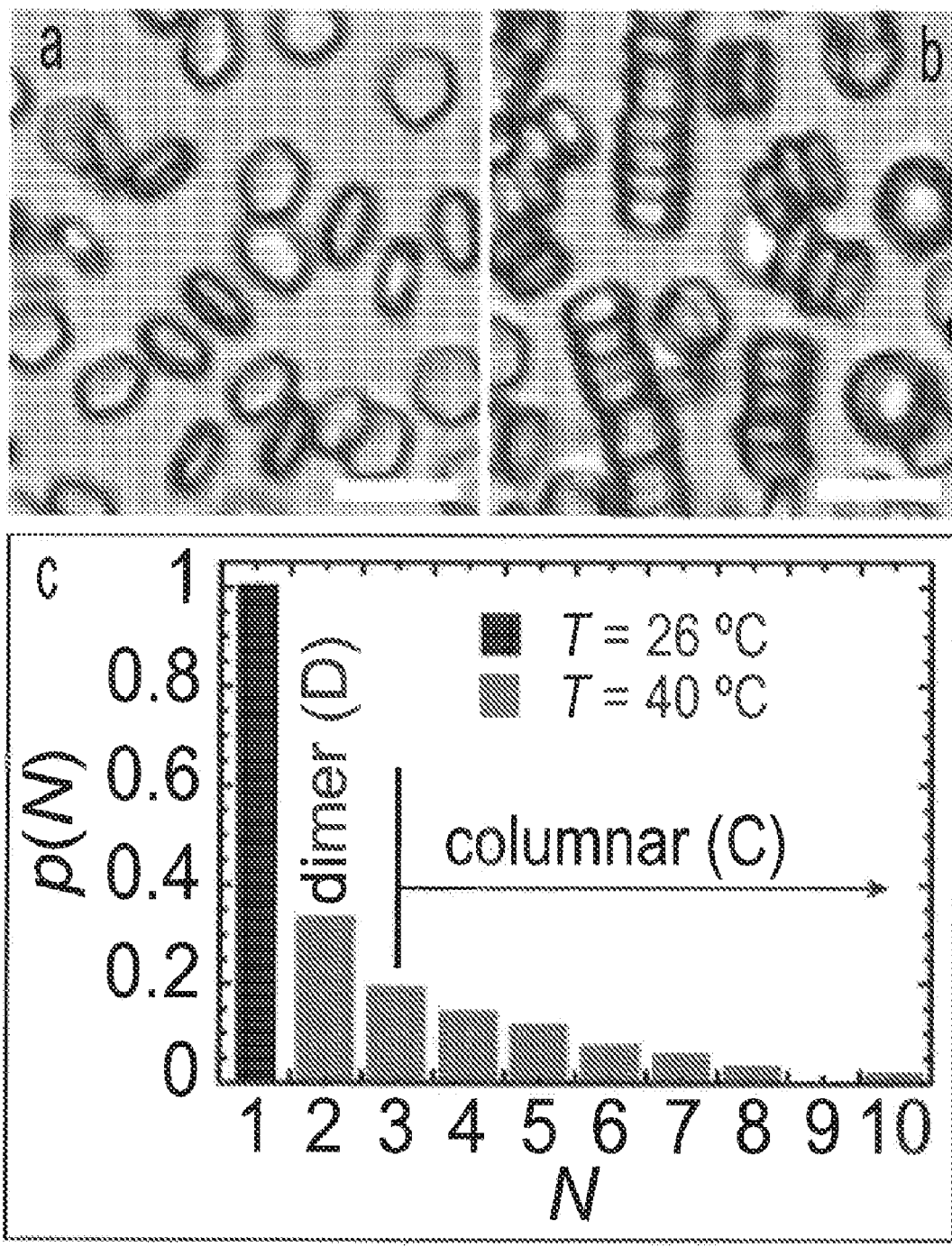
FIG. 7(a) is for lower T=26° C., d=15 nm and the pentagons remain unaggregated due to roughness (d<h).
FIG. 7(b) is for higher T=40° C., d=34 nm and the pentagons aggregate face-to-face into columns (d>h).
FIG. 7(c) show probability p of observing a column comprised of N pentagons at lower T (black bars) and higher T (red bars).

By increasing the size of pluronic micelles (P. Alexandridis, and T. A. Hatton, Colloids Surf. A 96, 1 (1995); P. Alexandridis, J. F. Holzwarthf, and T. A. Hatton, Macromolecules 27, 2414 (1994); S. L. Nolan et al., J. Colloid Interface Sci 191, 291 (1997)) through heating to make d>h, we can effectively 'turn on' the depletion attraction (J. R. Savage et al., Science 314, 795 (2006)) between particles that have rough surfaces through a mechanism that does not rely on the temperature dependence of $\phi_s$. Block copolymer pluronic micelles (P103) have d<h at lower temperature (d=15 nm at T=26° C.) and have d>h at higher temperature (d=34 nm at T=40° C.) without creating a large change in the micellar concentration, measured using dynamic light scattering. For sufficiently large $\phi_s$, as T is increased so that d exceeds h, the depletion attraction can be effectively turned on. We use 3.75 wt % of P103 in water, much larger than the critical micelle concentration (CMC) of 0.07 wt % at 26° C. (P. Alexandridis, J. F. Holzwarthf, and T. A. Hatton, Macromolecules 27, 2414 (1994)). As shown in FIGS. 7(*a*) and 7(*b*), pentagonal prisms aggregate face-to-face to form columns for T=40° C., and these reversibly disaggregate into individual platelets as T is cycled back to 26° C. For T=40° C., the distribution of column lengths favors shorter columns (FIG. 7(*c*)); as columns grow, the time for them to diffuse and approach end-to-end in order for the faces of the capping pentagons to meet becomes extremely long, and so the distribution is primarily governed by kinetics and is not an equilibrium state. This thermal method of controlling the depletion-induced aggregation by tuning d(T)/h differs from a method based on changing $\phi_s(T)$ (J. R. Savage et al., Science 314, 795 (2006)) near the CMC.

To further test our hypothesis, we tailor the roughness of the pentagons to increase the asperity heights and density. We have deposited uniform PS spheres that have a diameter of D=40 nm over all of the faces and sides of the pentagons, and we have repeated our observations of the aggregation using a variety of depletion agents. We now observe aggregation for d>D for the same $\phi_s$. This result is consistent with our hypothesis, since the effective asperity heights have been changed from h to D.

Figures 8A, 8B, 8C, 8D:
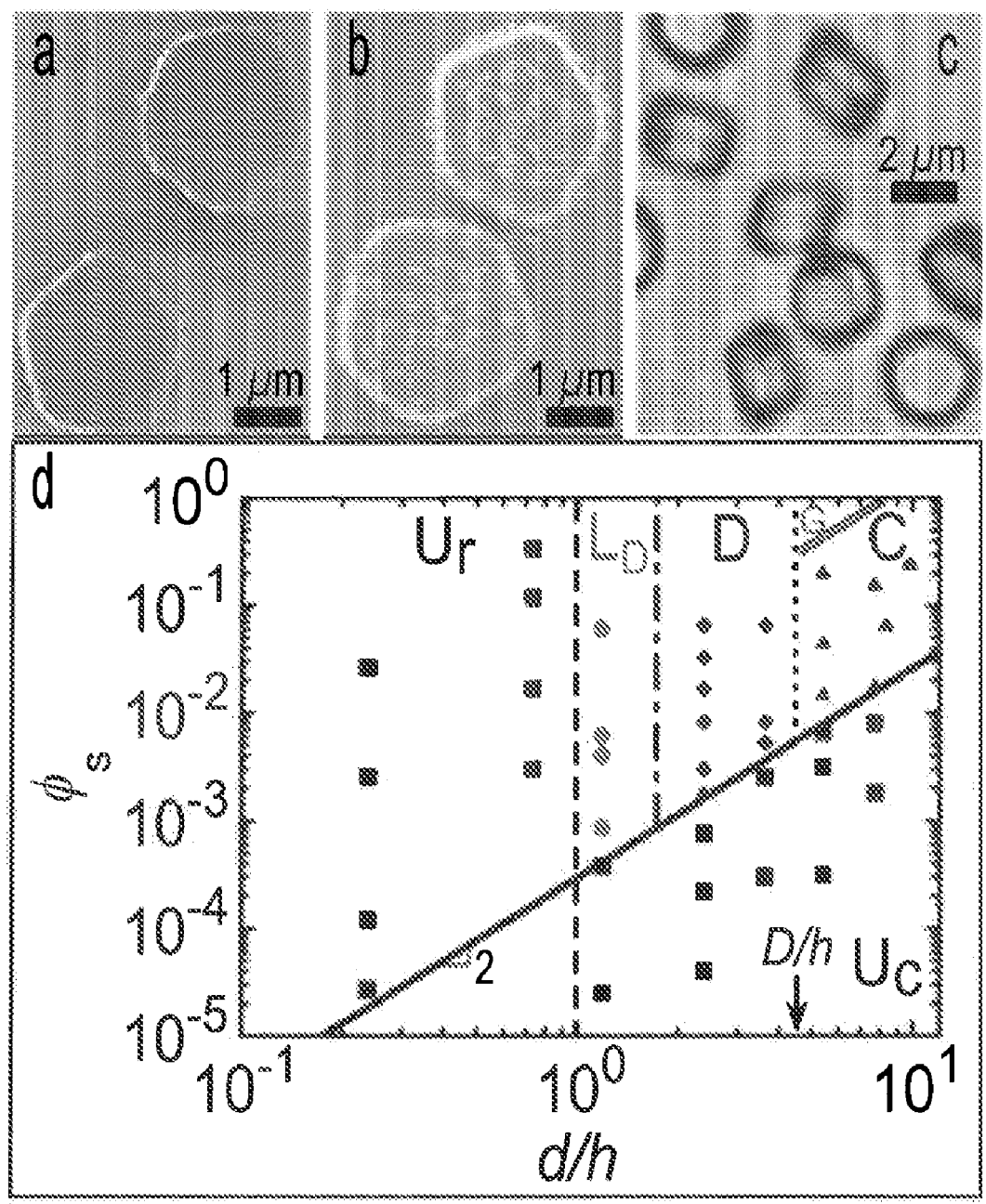
FIG. 8(a), the untreated faces have smaller roughness h≈17 nm.
FIG. 8(b), Opposite faces to which silica spheres are bound have greater roughness D≈75 nm.
FIG. 8(c), For h<d<D, the silica-modified Janus pentagons form aligned dimers when a depletion agent (PS spheres: d=40 nm at $\phi_s$=0.8%) is added (optical micrograph).
FIG. 8(d), Phase diagram of assembled structures: unaggregated pentagons ($U_r$ and $U_c$—black squares); offset lateral dimer aggregates ($L_D$—red circles); aligned dimers (D—green diamonds); long columnar stacks (C—blue triangles); disordered gel (G).

By altering the roughness on specific surfaces of the particles and systematically increasing d, we can provide a method to mass-produce one unique assembly in solution according to an embodiment of the current invention. After lithographically fabricating the platelets, but before they are released from the substrate, we increase the roughness of every pentagon by depositing a layer of silica nanoparticles with D=75 nm at about 20% areal density on only the top and side surfaces of each platelet. This provides two-faced pentagons that are Janus particles (C. Casagrande et al., Europhys. Lett. 9, 251 (1989)) in the sense of nanoscale surface roughness: one side has roughness D and the other side has roughness h. As shown in FIG. 8, when d<h<D, no aggregation occurs at any $\phi_s$ (region $U_r$). For d/h just larger than unity, offset face-to-face lateral aggregates of two particles are formed (region $L_D$). Above this, for h<d<D, we find a new regime in which we form an equilibrium dimer phase of two aligned pentagons (FIG. 8(*c*) and region D in FIG. 8(*d*)); no long columns form and monomers are essentially not present. The aligned dimers form when the two smoother surfaces of two Janus platelets aggregate face-to-face, exposing the rougher surfaces that cannot aggregate. For h<D<d, the hierarchical columnar aggregation and subsequent bundling is observed (region C), as in FIG. 6.

Figures 9A, 9B, 9C, 9D:
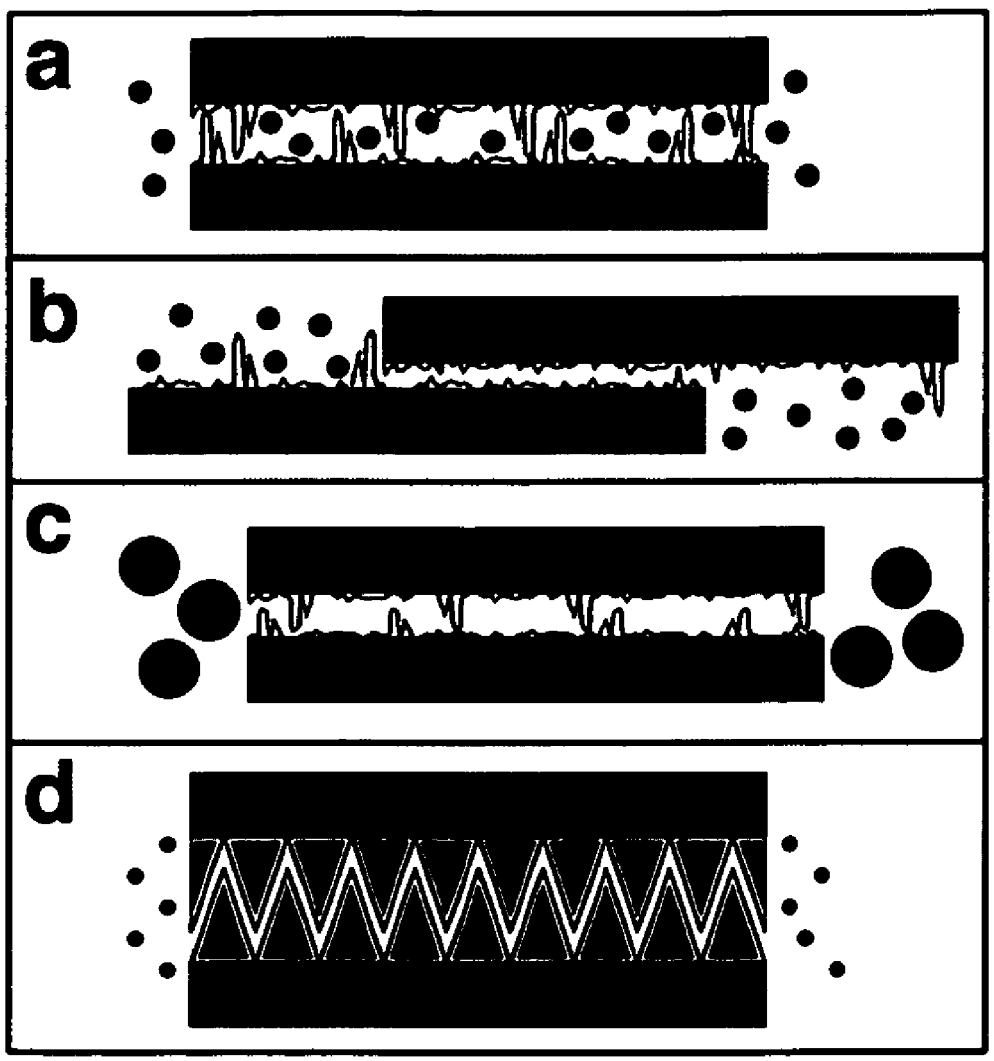
FIG. 9(a) shows particles having asperities with height h>d on the surfaces can greatly reduce the excluded volume between aligned plates, inhibiting aggregation.
FIG. 9(b) shows that thermal rearrangement can still lead to laterally offset face-to-face aggregation in which the largest asperities on one surface avoid contact with the opposite surface.
FIG. 9(c) shows that when d>h, the excluded volume becomes large, leading to columnar aggregation.
FIG. 9(d) shows that, in principle, ideally corrugated surfaces, such as a sawtooth pattern, can create larger excluded volumes and stronger depletion attractions than just simple flat surfaces.

The general problem of how surface roughness affects the strength and range of the depletion attraction is more interesting and rich. The strength of the depletion attraction between two rough faces is generally smaller compared to the perfectly smooth limit due to the reduction in excluded volume (FIG. 9(*a*)). An encounter of two faces in a perfectly aligned configuration is improbable, so particles will usually approach each other out of alignment. The particles can still aggregate face-to-face, but may remain laterally offset in a way that maximizes the excluded volume given the constraint of the asperities (FIG. 9(*b*)). This offset 'lateral' aggregation would be precluded by a uniform height distribution of non-interlocking asperities that densely cover the faces. When d>h, the excluded volume is large and the depletion attraction can cause aligned aggregation (FIG. 9(*c*)). A periodic triangular distribution of surface asperities that interlock could actually increase $V_e$ (FIG. 9(*d*)), making $U_f$ larger than what it would be between two perfectly flat surfaces.

Our excluded volume calculations of the depletion attraction between two rough surfaces support the physical explanations of the experimentally observed aggregation by roughness-controlled depletion attractions. These calculations provide numerical predictions that can be used to design the shapes and roughnesses of particles used to create desired composite structures through roughness-controlled depletion attractions. These calculations show that different probability distributions of the asperity positions and heights on the surfaces can affect the potential between flat and curved surfaces. Likewise, Brownian or molecular dynamics simulations that incorporate such roughness distributions could generate ensembles of particles that mimic actual dispersions; such simulations could provide a means of determining how variations in roughness, especially for very tall asperities, can affect the aggregation. However, the general concepts of the current invention are not limited to specific theoretical explanations.

Controlling the spatial distribution and heights of asperities on custom-shaped colloids can provide a method for creating complex assemblies comprised of many parts according to some embodiments of the current invention. By adding depletion agents from smaller to larger sizes, or by changing the temperature to increase d, it is possible to mass-produce unique desired assemblies by tailoring site-specific roughness on different surfaces of custom-shaped colloids according to some embodiments of the current invention. This approach, in combination with designing the surface areas of flat facets and controlling $\phi_s$ can provide precise control over many stages of directed aggregation according to some embodiments of the current invention.

Monodisperse microscale platelets (C. J. Hernandez and T. G. Mason, J. Phys. Chem. C 111, 4477 (2007); D. Dendukurl et al., Nature Mater. 5, 365 (2006); M. Sullivan et al., J. Phys.: Condens. Matter 15, s11 (2003); J. C. Love, D. B. Wolfe, H. O. Jacobs and G. M. Whitesides, Langmuir 17, 6005 (2001); A. B. D. Brown, C. G. Smith and A. R. Rennie, Phys. Rev. E 62, 951 (2000); E. Higurashi, H. Tanaka and O. Ohguchi, Appl. Phys. Lett. 64, 2209 (1994); M. D. Hoover, J. Aerosol Sci. 21, 569 (1990)) typically have a distribution of submicron asperity heights, p(h), with an average height h at a dimensionless surface density $\rho_A = N(S/A)$, where A is the surface area of the face of a platelet, N is the number of asperities on a face, and each asperity occupies an area S. When d<h, asperities can effectively suppress the depletion attraction by keeping the platelets apart and reducing the overlapping excluded volume $V_e$; however, when d≥h, the depletion attraction can become significantly larger than $k_B T$ and causes columnar aggregation. Particulate self-assembly can be directed by controlling roughness on a particle's surface using methods such as particulate deposition, etching, and lithography (M. J. Madou, *Fundamentals of Microfabrication: The Science of Miniaturization* 2nd ed.; (CRC Press, Boca Raton, 2002)). By selectively decorating one side of each platelet with nanoparticles having diameter D>h, thereby making two-faced Janus particles in roughness, and by adding a depletion agent with h<d<D, a thermodynamic phase of dimers can be formed (K. Zhao and T. G. Mason, Phys. Rev. Lett. 99, 268301 (2007)). Following this paradigm, multiple stages of aggregation can be used to mass-produce complicated assemblies in solution according to some embodiments of the current invention.

In the following examples, we examine how surface asperities can be used to either reduce or increase $V_e$ using a model that reveals the richness of roughness-controlled depletion attractions. We decorate the smooth surfaces of flat platelets with hemi-spheroidal asperities having height h and base radius a, and we determine $V_e$ between the opposing decorated surfaces for: (1) ordered uniform hemispheres in a regular hexagonal array (h=a); (2) randomly positioned but non-overlapping uniform hemispheres (h=a); (3) hexagonally ordered uniform hemi-spheroids with uniform height (h≠a); (4) randomly positioned but non-overlapping hemi-spheroids with uniform height (h≠a); and (5) randomly positioned hemi-spheroids with a truncated Gaussian distribution of heights and a small number of outlying asperities. For cases 1 and 3, we consider hexagonal lattices on opposing surfaces that interdigitate. We show that the depletion attraction between the platelets can be greatly suppressed when just a few asperities having h>d effectively hold the plates apart, inhibiting the formation of a large $V_e$. Moreover, for large $\rho_A$ of ordered asperities that interdigitate, $V_e$ can actually be increased compared to smooth platelets due to the higher surface area-to-volume ratio of spiky surfaces. These models provide key insights into how roughness can suppress and enhance depletion attractions according to some embodiments of the current invention.

To calculate the depletion potential energy, we first calculate $V_e$. We decorate two square platelets with asperities having $A^{1/2} \gg a$, hold the platelets far apart, and keep them parallel with their edges aligned as they are brought together. Two imaginary surfaces, extending outward by d/2 normal to each of the two rough surfaces, overlap to yield $V_e$ as the plates nearly touch. Touching occurs when any asperity or the smooth flat substrate of one plate overlaps with any asperity or the smooth flat substrate of the other plate. Tilting, rotation, and lateral movement of plates are not allowed. After determining $V_e$, we calculate the normalized depletion potential, $U_n$, which is given by the absolute depletion potential U between the two rough plates divided by the magnitude of the depletion potential between two smooth plates with the same projected area: $U_n = U/|U_{fl}| = -V_e/(Ad)$. Thus, $U_n = -1$ represents the limiting case of two perfectly smooth, flat, parallel surfaces touching. In all cases, $U_n$ is the strongest (i.e. most negative) when the two rough surfaces touch, and we determine this minimum value $U_n^{min}$. For disordered surfaces, many trials provide a good estimate of $U_n^{min}$ for aligned platelets; for diffusing platelets that can tilt, rotate, and laterally move to find a lower energy state due to thermal fluctuations, this estimate sets an upper bound. Since both U and $U_{fl}$ vary linearly with $\phi_s$, $U_n$ and $U_n^{min}$ are independent of $\phi_s$ and simply reflect the surface geometry.

Figures 10A, 10B, 10C:
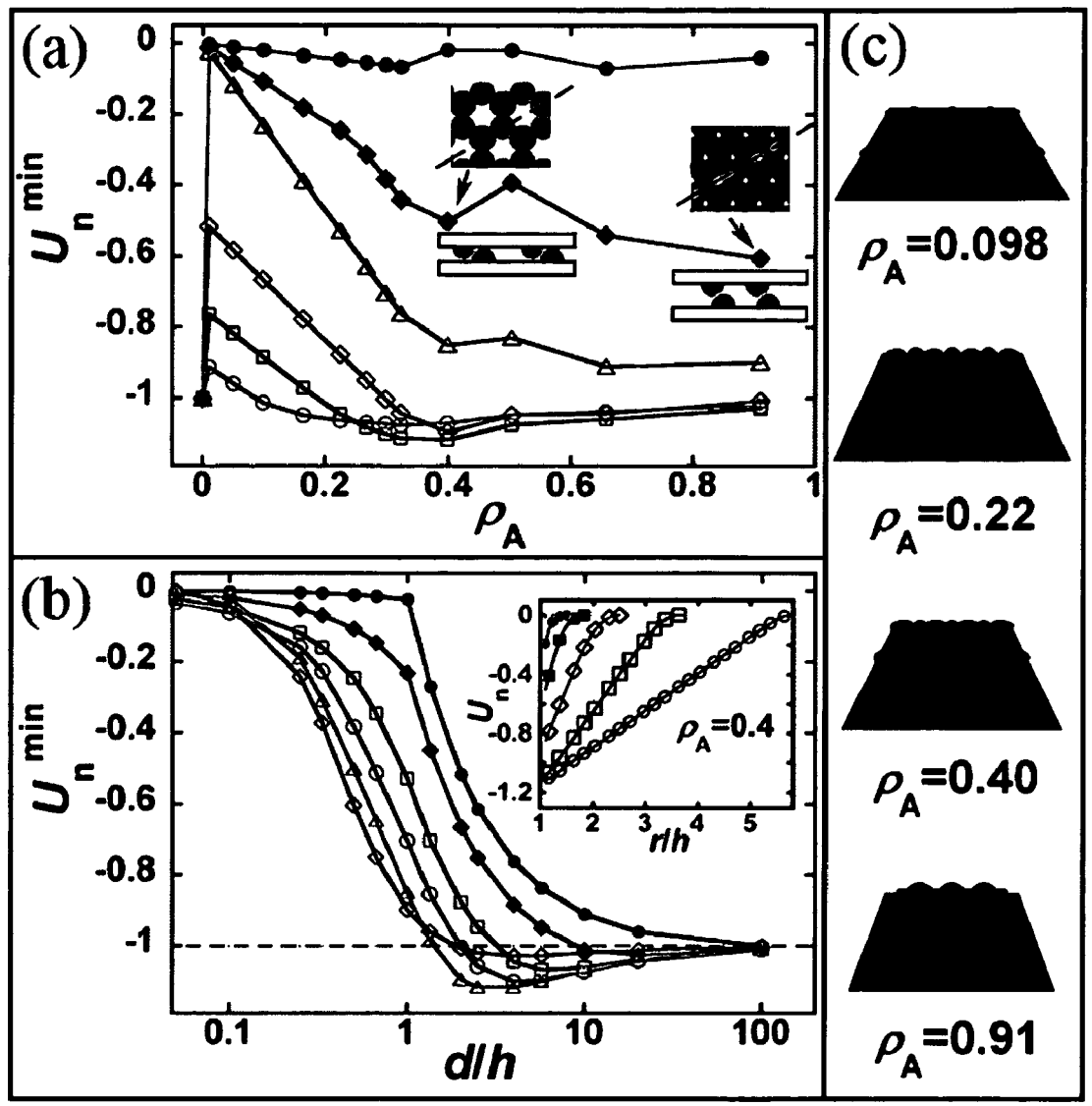
FIG. 10(a) shows minimum depletion potential (normalized) $U_n^{min}$ versus areal surface density $\rho_A$ (i.e. the dimensionless area fraction occupied by asperities) calculated for hexagonally ordered hemi-spherical asperities decorating flat surfaces at different ratios of the depletion agent diameter d to the asperity height h: d/h=10 (○), 4(□), 2 (◇), 1 ((⊠),), 0.5 (◆), 0.1 (●). Upper and lower insets: top and side views of decorated surfaces shown at the minimum separation for $\rho_A$=0.40 and 0.91, respectively. Arrows point to corresponding $U_n^{min}$.
FIG. 10(b) shows $U_n^{min}$(h/d) at different $\rho_A$=0.91 (◇), 0.40 ((⊠),), 0.30 (○), 0.22 (□), 0.098 (◆), 0.01 (●). Dashed line at $U_n^{min}$=−1 corresponds to perfectly smooth surfaces with $\rho_A$=0. Inset: normalized depletion potential $U_n$ versus the dimensionless separation r/h between the flat substrates of the two surfaces at $\rho_A$=0.40 for d/h=0.25 (●), 0.5 (◆), 1 (◇), 2 (□), 4 (○).
FIG. 10(c) shows surfaces roughened by ordered hemispheres. For $\rho_A$=0.91, we show only portions of the upper hemispheres for clarity.

For surfaces having hemispherical asperities that interdigitate (case 1), $V_e$ as a function of plate separation r is calculated uniquely from a single approach. Due to the interdigitation, many contacts are made simultaneously when the rough surfaces touch (FIG. 10(a)), thereby assuring mechanical stability. Just beyond the smooth limit ($\rho_A=0$ where $U_n^{min}=-1$), the calculated $U_n^{min}(\rho_A)$ reveals that only a very small $\rho_A$ of asperities having h>>d is sufficient to almost completely extinguish the depletion attraction, even when the final minimum separation $r_{min}=h$. As $\rho_A$ increases up to about 0.40, $r_{min}=h$, while the depletion attraction becomes stronger as $V_e$ increases primarily due to asperity-plate overlap. For $\rho_A>0.4$, asperities no longer touch the flat substrate and $r_{min}>h$, causing $U_n^{min}$ to be slightly weakened; $V_e$ primarily arises from asperity-asperity overlapping excluded volumes. Finally, as $\rho_A \to 0.91$, $r_{min}=1.69a$, effectively matching the theoretical value of $2(2/3)^{1/2}a=1.63a$ within the discretization uncertainty of the simulation, and $|U_n^{min}|$ grows. We also show $U_n^{min}(d/h)$ for case 1 for fixed $\rho_A$ (FIG. 10(b)). As d/h approaches and exceeds unity, the inhibition of the depletion attraction becomes less extreme, and when $h\to 0$ (i.e. smooth surfaces), $U_n^{min}=-1$, regardless of $\rho_A$. For d>h, $U_n^{min}$ can be slightly less than −1 over a range of $\rho_A$ near 0.4 and d≈4h, since the significant additional surface area of the rough interdigitated platelets can create greater $V_e$ than for smooth platelets alone. For a wide range of $\rho_A$ and even for $\rho_A \leq 10^{-2}$, the depletion attraction becomes noticeably weakened as d/h<10, and it almost vanishes for d/h≤1. By contrast, for d/h>>1 and larger $\rho_A$, $|U_n^{min}|$ can become slightly stronger than for smooth plates since the roughness increases the surface area and the perfect interdigitation of ordered asperities results in larger $V_e$. For $\rho_A=0.4$, $U_n(r/h)$ shows that the strength and range of the attraction diminish as d/h decreases (FIG. 10(b)—inset).

Figures 11A, 11B:
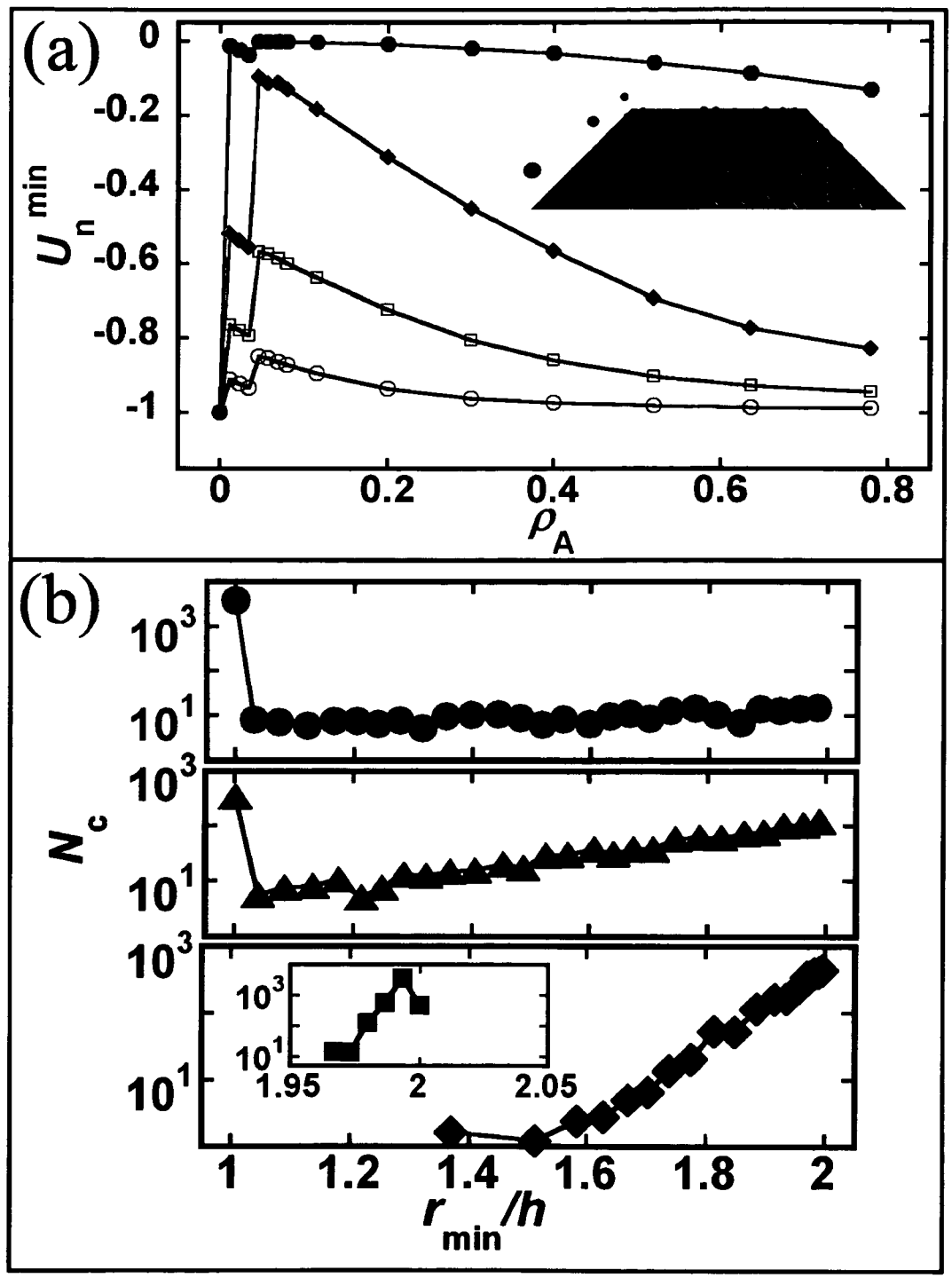
FIG. 11(a) shows minimum depletion potential (normalized) $U_n^{min}$ versus $\rho_A$ calculated for randomly positioned, non-overlapping, hemi-spherical asperities that decorate flat surfaces at different ratios d/h=10 (○), 4 (□), 2 (◆), 0.5 (●). Inset is a 3-d view of one surface with $\rho_A$=0.23. Spheres having the same radii as the radius of the hemi-spherical asperities, a, show scale in the perspective (left side).
FIG. 11(b) shows distribution of minimum separation, $N_c(r_{min}/h)$, determined from an ensemble of simulations of two rough surfaces for $\rho_A$=0.012 (●), 0.035 (▲), 0.069 (◆), and 0.30 (■)-(inset).

We next examine an ensemble of 5000 approaches of two surfaces having randomly positioned but non-overlapping uniform hemispheres (case 2). The flat substrates are kept parallel with their edges aligned during approach until the rough surfaces touch at least at one contact point. If the center of a plate is inside the area given by three or more contact points, then the touching plates are mechanically stable. For $\rho_A>0.23$, we find that 97% of the approaches yield mechanical stability, whereas only 0.4% are stable for $\rho_A<0.20$. In FIG. 11(a), we show the most-probable depletion potential calculated for the ensemble of approaches. For the randomly positioned asperities, roughness reduces the strength of the attraction for d/h≤1, even at low $\rho_A$, similar to the trend shown in FIG. 10(a). Since random asperities do not interdigitate, their extra surface area cannot be efficiently used to amplify the depletion attraction, so $|U_n^{min}| \leq 1$. The jump in $U_n^{min}(\rho_A)$ at low $\rho_A \approx 0.01$ corresponds to key changes in the minimum separations due to the asperity-flat surface contacts. The second jump at $\rho_A=0.046$ corresponds to changes in the minimum separations due to a significant frequency of asperity-asperity contacts. The ensemble averaged $U_n^{min}(\rho_A)$ is essentially a smoothed version of the trends shown for the most probable $U_n^{min}(\rho_A)$. In FIG. 11(b), we show the distributions of the final separations between the flat substrates when touching occurs. Except in very rare cases, approaches at dilute $\rho_A \ll 1$ yield a most probable minimum separation $r_{min}=h$; by contrast, for $\rho_A \geq 0.1$, tip-to-tip contacts of asperities are very frequent and $r_{min} \approx 2h$.

For hexagonally-ordered hemi-spheroids having uniform h≠a (case 3), the general trends in $U_n^{min}(\rho_A, d/h)$ are similar to those for hemispheres. However, when h/a becomes large, the interdigitated, spiky surfaces can create a much larger $V_e$ and greatly amplify the depletion attraction by more than a decade (see FIG. 15). For randomly positioned, non-overlapping hemi-spheroids having uniform h≠a (case 4), the general trends shown in FIG. 11 are found again, and $|U_n^{min}| \leq 1$ (see FIG. 16).

Figures 12A, 12B:
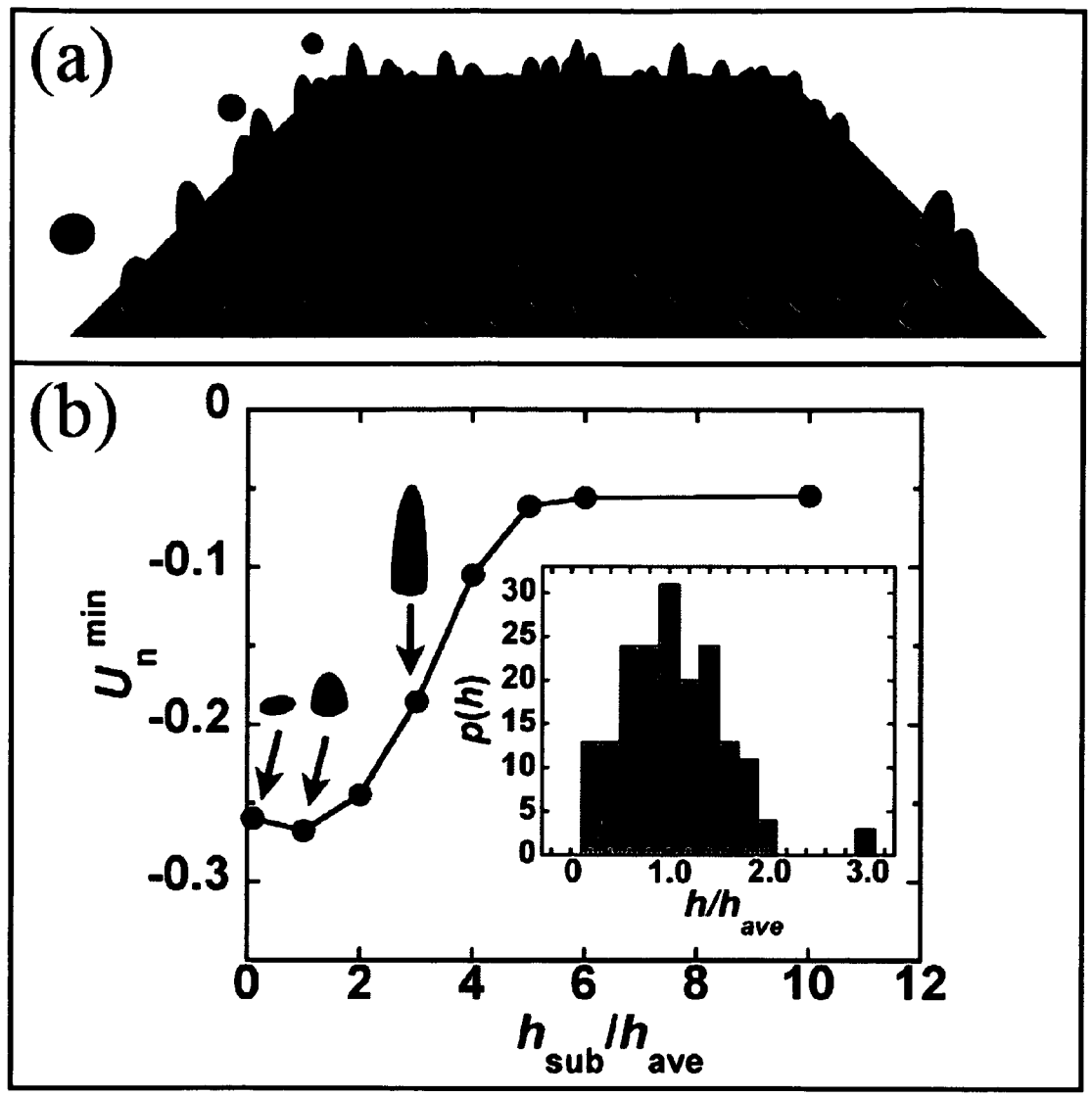
FIG. 12(a) shows an example of randomly positioned hemi-spheroidal asperities having a truncated Gaussian distribution with a small sub-population of taller asperities $h_{sub}$=3$h_{ave}$ at total surface density $\rho_A$=0.25. Spheres having the same radii as the radius of the base of the hemi-spheroidal asperities, a, show scale in the perspective (left side).
FIG. 12(b) shows minimum depletion potential (normalized) $U_n^{min}$ versus $h_{sub}/h_{ave}$ when $\rho_A$=0.25 and d=4a. Inset: height histogram of the surface in part (a).

Since the surfaces of real platelets typically have a distribution of asperity heights, p(h), we have also introduced asperities having both random positions and heights onto opposing surfaces and calculated $V_e$ (case 5—FIG. 12(a)). Fixing $\rho_A=0.25$ and d=4a, we create a truncated Gaussian distribution having a mean $h_{ave}=2a$, width $s=h_{ave}/2$, lower cutoff height $h_{1c}=h_{ave}/10$, and upper cutoff height $h_{uc}=2h_{ave}$, to which we systematically add a sub-distribution of only three asperities that each have a height $h_{sub}$. When $h_{sub}<h_{ave}$, $|U_n^{min}|$ remains fixed, reflecting the main truncated Gaussian distribution (FIG. 12(b)); the sub-population of small asperities has little effect. However, when $h_{sub}$ approaches and exceeds $h_{uc}$, $V_e$ is strongly reduced. Thus, $U_n^{min}$ can be extremely sensitive to only the few tallest asperities present on a surface. Moreover, by laterally displacing one platelet relative to another and approaching the two platelets so that tallest asperities of the sub-population do not touch the other plate, $V_e$ can increase substantially. This explains the observed lateral aggregation of platelets that have only a few asperities taller than d (K. Zhao and T. G. Mason, Phys. Rev. Lett. 99, 268301 (2007)).

Figure 13:
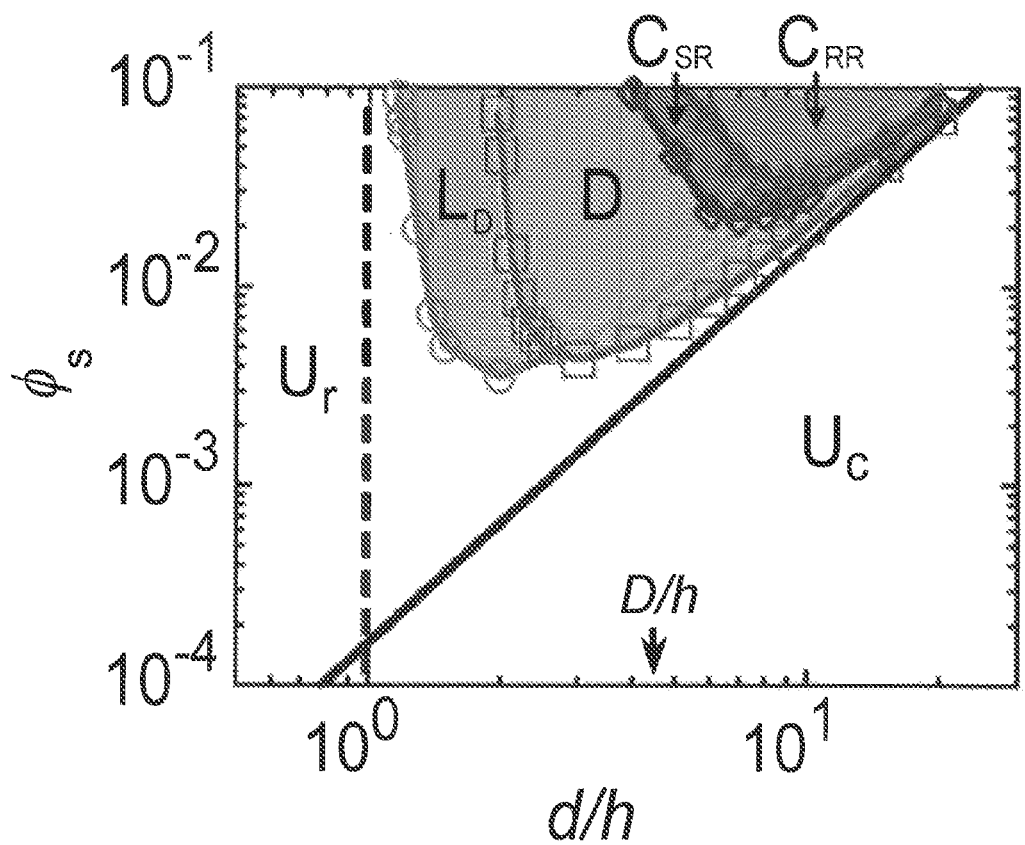
FIG. 13 shows a calculated phase diagram of Janus platelets. Asperities on the smoother S-surfaces have density $\rho_A$=0.115 and typical height h; on the rougher R-surfaces, $\rho_A$=0.024 and height is D. Lines and symbols mark |U|=6$k_B$T: S-S surfaces (lateral offset allowed) (○); S-S surfaces (◇); S-R surfaces (□); R-R surfaces ((⊠).). Solid straight line: |$U_{fl}$|=6$k_B$T for smooth platelets. Beyond d/h=1 (dashed line), labeled regions of lowest energy configurations are: $L_D$ (lateral dimers—red); D (aligned dimers—green); $C_{SR}$ (long columns dominated by S-R attractions without R-R attractions—blue); $C_{RR}$ (long columns can have R-R, S-R, and S-S attractions—purple); $U_c$ and $U_r$ (unaggregated monomer platelets—black).

Using these simulation results, we determine the lowest energy configurations of Janus platelets using depletion agents having d and $\phi_s$ similar to experiments (K. Zhao and T. G. Mason, Phys. Rev. Lett. 99, 268301 (2007)). One side of a Janus platelet has smaller asperities characterized by a height h (smoother S-surface), and the other side has larger hemispherical asperities characterized by D (rougher R-surface). We use a truncated Gaussian distribution plus a sub-population of several taller asperities to mimic a real distribution of S- and R-asperities. For $\rho_A$ similar to experimental values, we calculate the depletion attraction for configurations of S-S surfaces (aligned and laterally offset), S-R surfaces, and R-R surfaces (see Suppl. Mat.). We plot contours where $|U|=6k_BT$ in $\phi_s(d/h)$, and shade regions based on the lowest energy configuration (FIG. 13). Calculated lateral dimer ($L_b$), aligned dimer (D), and columnar (C) states are consistent with experimental observations. Moreover, the simulations reveal that two different columnar phases, $C_{SR}$ and $C_{RR}$, exist, although these would be indistinguishable in optical microscopy experiments. In $C_{SR}$, R-R attractions are not present; stable columns consist of nearly all S-R and up to one S-S attraction. By contrast, in $C_{RR}$ at higher d/h and $\phi_s$, R-R attractions also become significantly stronger than $k_BT$ and are permitted within stable columns. The simulated phase diagram reasonably explains the primary features of the empirically observed one, since real Janus platelets can have a wide variety of asperity shapes, heights, and positional distributions.

We have provided a quantitative foundation for roughness-controlled depletion attractions. Depletion attractions can be suppressed by orders of magnitude due to the presence of only a relatively small number of taller asperities on an otherwise smooth surface. For taller asperities that interdigitate, $|U|$ can be enhanced through the larger area of the rough surface, yet enhancement of $|U|$ is difficult to achieve for surfaces with randomly positioned asperities. Simulations of dispersions of roughened Janus platelets yield a diagram that reproduces the observed phases and reveals two new types of columnar phases. Based on these results for flat surfaces, we anticipate that roughness will also profoundly affect depletion interactions between curved surfaces.

Calculating Normalized Depletion Potential Energies

Figure 14:
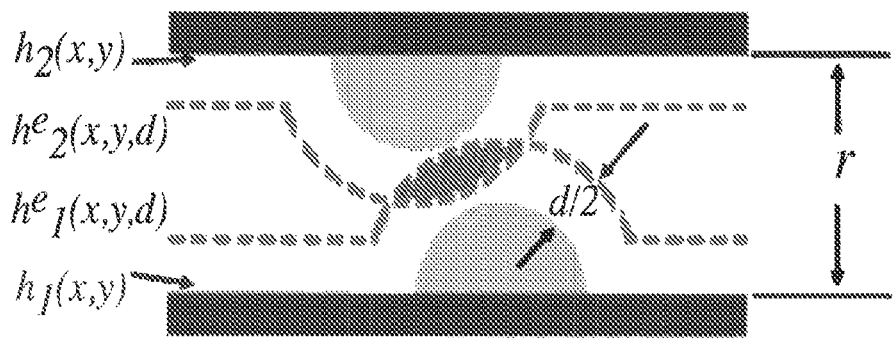
FIG. 14 is a schematic cross-sectional side view illustrating the method of calculating the overlapping excluded volume (gray region), $V_e$, near two asperities (light) on the surfaces of two smooth, flat walls (dark). The surface height functions describing the lower and upper surfaces are $h_1(x,y)$, and $h_2(x,y)$, respectively. Surface height functions describing the boundaries of excluded volume of a depletion agent (not shown) of diameter d are: $h^e_1(x,y,d)$ (lower surface—green dashed line) and $h^e_2(x,y,d)$ (upper surface—dashed line).

After decorating two square platelets with asperities, we determine two surface height functions $h_1(x,y)>0$ and $h_2(x,y)>0$ that represent the upper and lower solid surfaces, respectively (see FIG. 14). Assuming d is the diameter of spherical depletion agent, we calculate the two corresponding surfaces of excluded volume for the two platelets, $h^e_1(x,y,d)>0$ and $h^e_2(x,y,d)>0$ (dashed lines in FIG. 14). The two platelets are kept parallel with their edges aligned at a separation, r, and we calculate a differential element of height, $\delta h(x,y,d,r)=h^e_1(x,y,d)+h^e_2(x,y,d)-r$. The surfaces are discretized, and for each grid point $(x_i, y_j)$, where i and j represent integer indices, if $\delta h(x_i,y_j,d,r)\geq0$, then the excluded volumes of two surfaces overlap, and the overlapping excluded volume is simply $\delta V^e(x_i,y_j,d,r)=\delta h_{ij}\delta S_{ij}$, where $\delta S_{ij}$ is the surface area of grid point (i,j). If $\delta h(x_i, y_j,d,r)<0$, then at that grid point, the excluded volume doesn't overlap and we set $\delta V^e(x_i, y_j,d,r)=0$. The total overlapping excluded volume is:

$$V_e = \sum_{i,j} \delta V^e(x_i, y_j, d, r).$$

After obtaining $V_e$, we then calculate the normalized depletion potential, $U_n$, which is given by the absolute depletion potential U between the two rough plates, divided by the magnitude of the depletion potential that is found between two smooth plates that have the same projected area: $U_n=U/|U_{fl}|=-V_e/(Ad)$. The strongest depletion attraction occurs when two platelets touch and r is minimal: $r_{min}=\max[h_1(x,y)+h_2(x,y)]$, and the normalized depletion potential at this minimum separation is $$U_n^{min} = -\sum_{i,j} \delta V^e(x_i, y_j, d, r_{min})/(Ad).$$

In order to determine $U_n(r)$ as the platelets are separated, we first calculate $U_n^{min}$ at $r=r_{min}$, and then we repeatedly increase the separation r by a small increment and re-calculate the smaller $V_e$.

Case 3: Hexagonally Ordered Hemi-Spheroids

Figure 15:
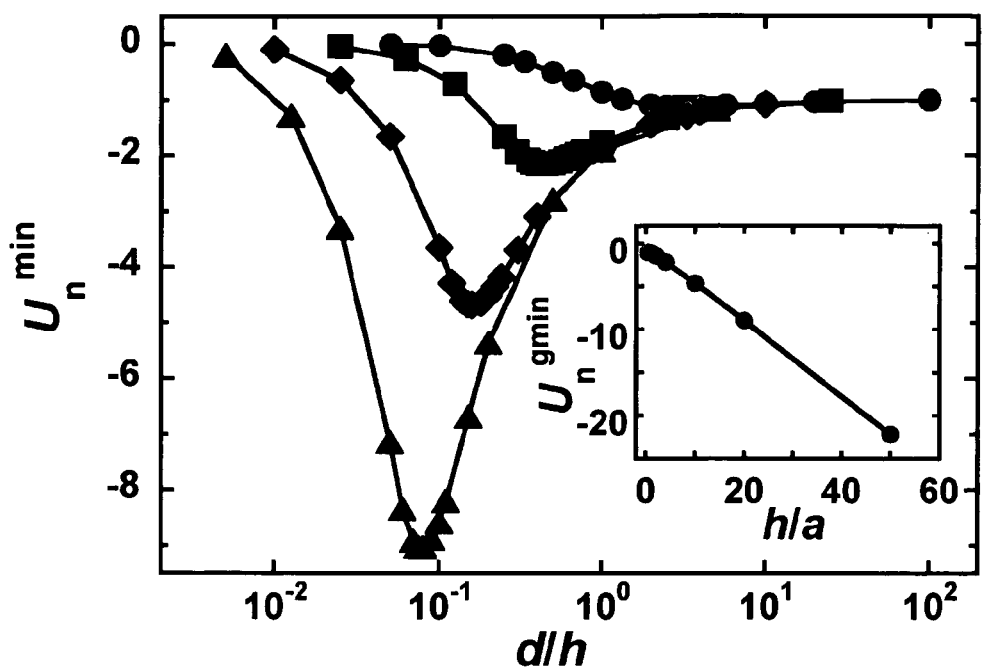
FIG. 15 shows minimum depletion potential (normalized) $U_n^{min}$(d/h), where d is the depletion agent diameter, calculated for hexagonally ordered hemi-spheroidal (uniform height h and base radius a) asperities decorating flat surfaces at fixed surface density $\rho_A$=0.40: h/a=1 (●), 4 (■), 10 (◆), 20 (▲). Inset: global-minimum depletion potential (normalized) $U_n^{gmin}$(h/a) for surfaces decorated with uniform hemi-spheroids.
Figure 16:
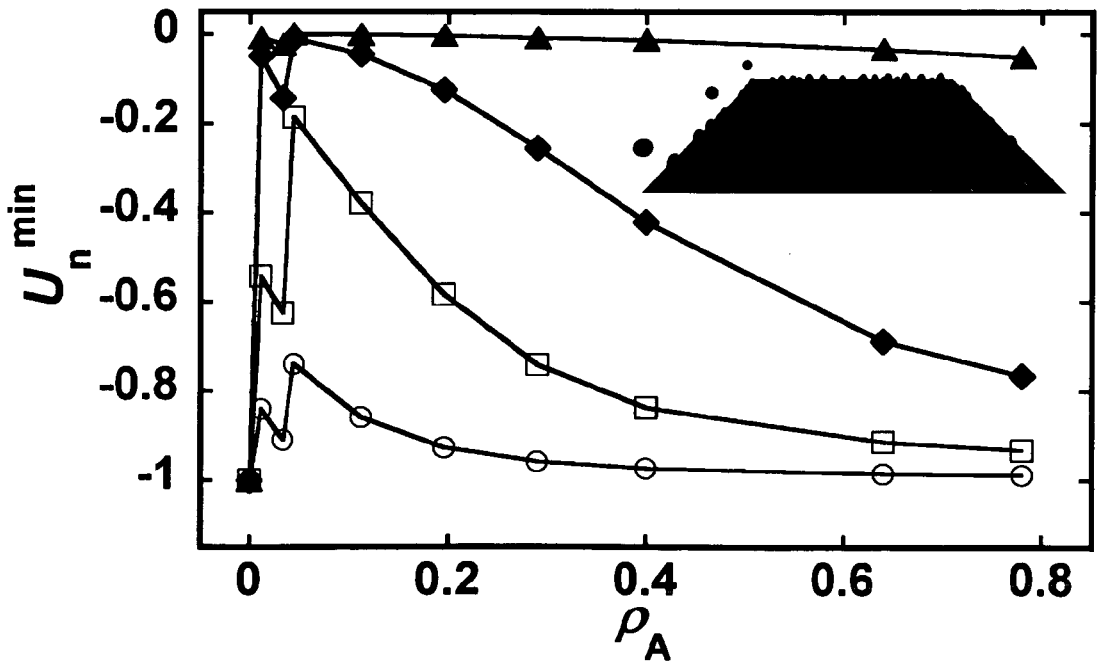
FIG. 16 shows minimum depletion potential (normalized) $U_n^{min}$ versus dimensionless surface density $\rho_A$ calculated for randomly positioned, non-overlapping, hemi-spheroidal asperities that decorate flat surfaces at different ratios d/h=5 (○), 2 (□), 1 (◆), 0.25 (▲) with fixed heights h=2a. Inset: 3-d view of one surface with $\rho_A$=0.23. Spheres of radii a (left side) show scale in the perspective.

For hexagonally-ordered hemi-spheroids having uniform $h\neq a$ (case 3), the general trends in $U_n^{min}(\rho_A, d/h)$ are very similar to those for hemispheres. However, when h/a of the hemi-spheroids becomes large, the interdigitated, ordered, spiky surfaces can create a much larger $V_e$ and greatly amplify the strength of the depletion attraction (FIG. 15). Even for d<h, if h/a is large, then the depletion attraction can still be stronger than for two smooth plates. Indeed, for h/a>>1, by optimizing d relative to h to achieve the maximum attractive strength, the global minimum normalized potential $U_n^{gmin}$ can become more than a decade stronger than for the limit of smooth plates (FIG. 15—inset).

Case 4: Randomly Positioned Hemi-Spheroids

Randomizing the positions of uniform hemi-spheroids effectively eliminates the potential for enhancement of the depletion attraction through interdigitation. Instead, the likelihood of the plates being held further apart through asperity-asperity contact is greatly increased. Because of the positional randomness, we do not find any significant probability for enhancing the depletion attraction in this case. Instead, $U_n^{min}(\rho_A)$ for hemi-spheroids with h=2a (FIG. 16) closely resembles what has been shown for randomly positioned hemi-spheres in FIG. 11(a). We find similar results for larger ratios of h/a. Even for very low $\rho_A$, the strong suppression of the depletion attraction is found for all d/h<1, providing a mechanism of controlling depletion attractions through h.

Calculation of Janus Platelet Phase Diagram

To calculate the lowest energy diagram for roughened Janus platelets shown in FIG. 13, we have selected distributions of asperity heights that resemble those in experiment (see K. Zhao and T. G. Mason, Phys. Rev. Lett. 99, 268301 (2007)). Because the asperities on the surfaces of real platelets can have a broad distribution of shapes, sizes, and aspect ratios, these simulated distributions can only be viewed as approximations of the actual ones, which are quite difficult to experimentally characterize. One flat surface of each platelet is smoother (S-surface), having a typical length scale of asperity heights, h, and the other surface is rougher (R-surface), having a typical length scale of asperity heights, D. In the experiment, h≈17 nm, D≈75 nm, A≈5.6 μm², and in the simulations, we set a=h=15 nm, D=66 nm, A=4.3 μm².

In the simulations, for the S-surfaces, the asperities are hemi-spheroids and follow a truncated Gaussian distribution ($h_{ave}=a/7.5$, $s=h_{ave}$, $h_{hc}=2h_{ave}$, $h_{1c}=h_{ave}/2$) plus a sub-population of 4 asperities with $a_s=a/7.5$ and $h_{sub}$ between $9h_{ave}$ and $10h_{ave}$, and 2 asperities with $a_s=a/7.5$ and $h_{sub}=15h_{ave}$. These tall, spike-like hemi-spheroids greatly reduce the depletion attraction for d/h<1. The surface density of asperities is $\rho_A=0.115$.

For the R-surfaces, the shape of an asperity is a cylinder with one end capped with a hemisphere. The radii of hemispheres is D/2, and the heights of asperities are chosen according to a truncated Gaussian distribution ($h_{ave}$=D/1.12, s=D/11, $h_{hc}$=D, $h_{1c}$=D/1.25) plus a sub-population of 2 asperities with $h_{sub}$=1.37$h_{ave}$. This distribution reflects the polydispersity of the silica spheres and the underlying surface roughness of the particle surfaces upon which the silica spheres had been deposited. The density of asperities is $\rho_A$=0.024, adequate to induce a suppression of the depletion attraction, yet smaller than in the experiment to reduce calculation times.

For aligned S-S surfaces, S-R surfaces and R-R surfaces, since tilting, rotation and lateral movement of surfaces are not allowed, we follow the standard procedure described above to calculate the normalized depletion potential energy $U_n^{min}$(d). The depletion potential energy U is the product of the normalized (i.e. dimensionless) depletion potential energy with the energy associated with an undecorated face:

$$U = U_n^{min}|U_{\mathit{ff}}(\phi_s, d)| = U_n^{min}\phi_s k_B T \frac{6A}{\pi d^2}. \quad (2)$$

Rearranging, the volume fraction of the depletion agent is:

$$\phi_s = \frac{U}{k_B T} \frac{1}{U_n^{min}} \frac{\pi d^2}{6A}. \quad (3)$$

For a fixed U/($k_B$T), we obtain an isoenergy contour line for $\phi_s$(d) for each type of aligned face-to-face configuration.

Figure 17:
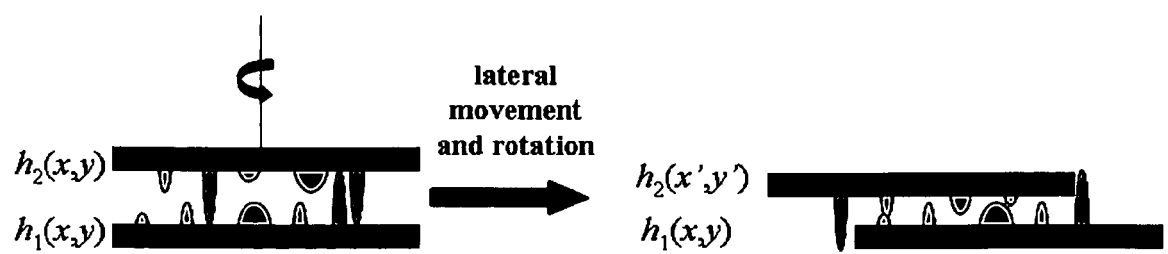
FIG. 17 is a schematic side view of two platelets having asperities, showing that through the lateral movement and rotation of one surface, the two platelets can partially overlap with a larger excluded volume (right side) than when taller, spike-like asperities keep the plates spaced further apart (left side).
Figure 20:
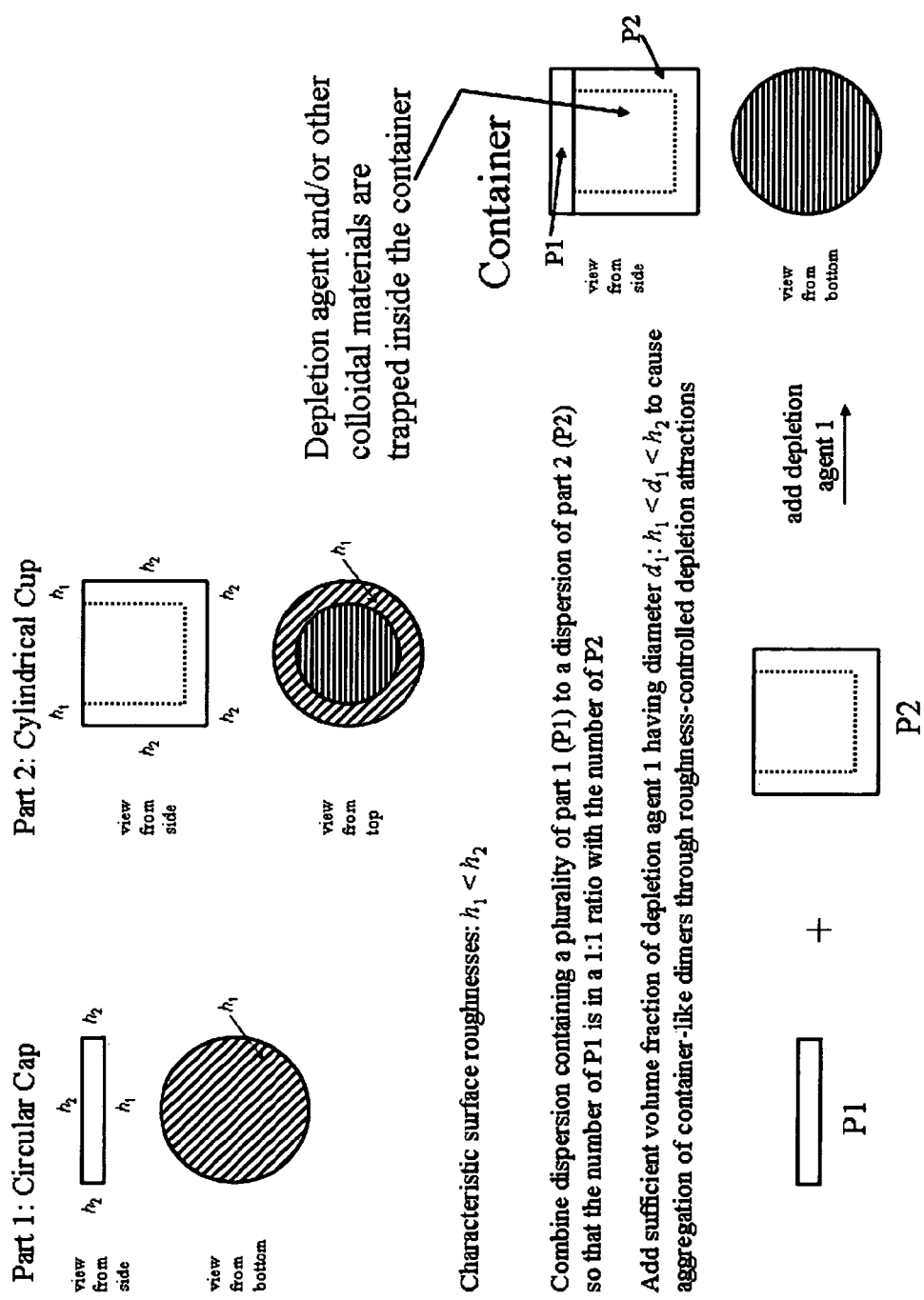
FIG. 20 is an example of a composite structure and method of production according to another embodiment of the current invention.
Figure 21:
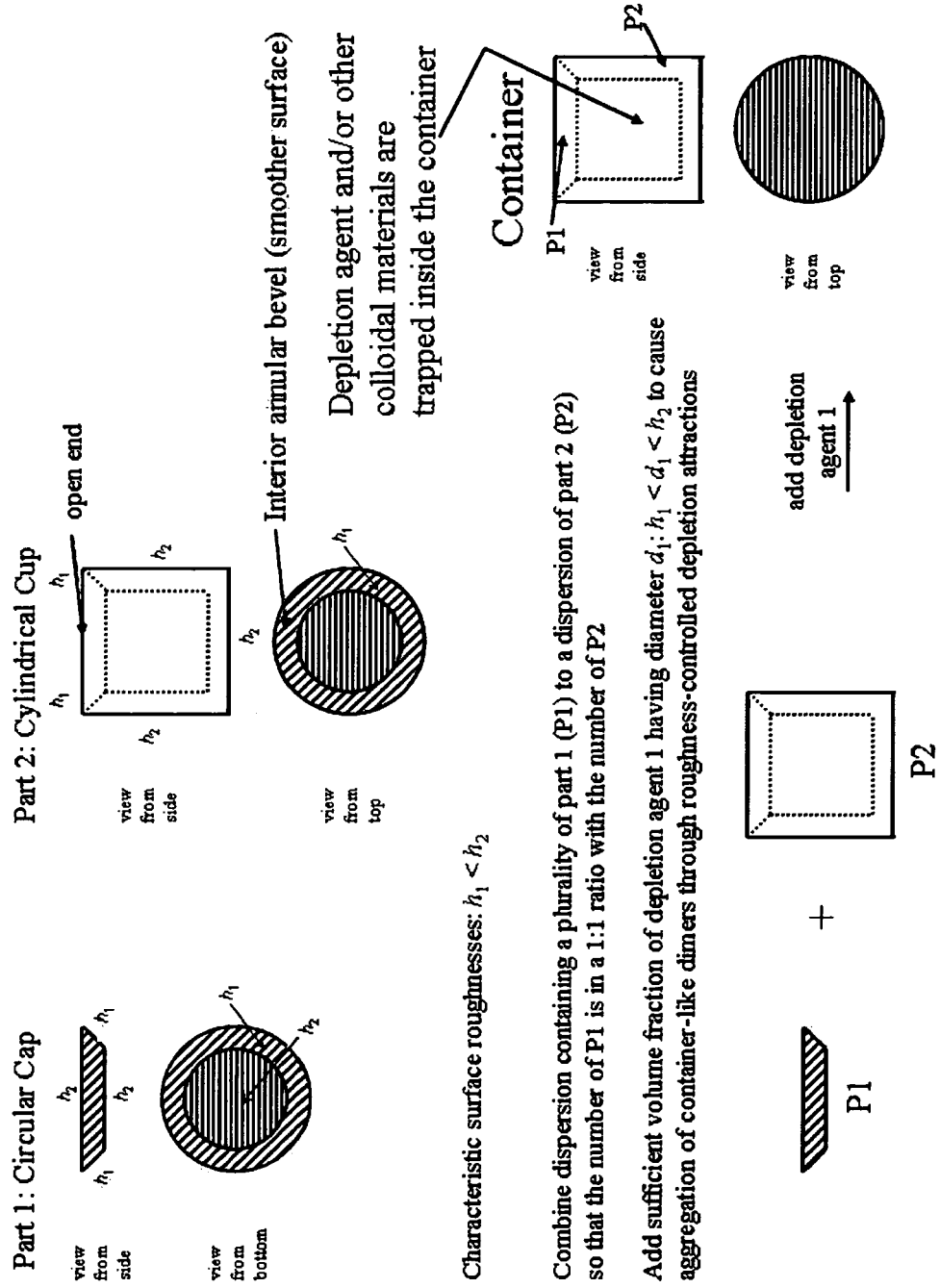
FIG. 21 is an example of a composite structure and method of production according to another embodiment of the current invention.
Figure 29:
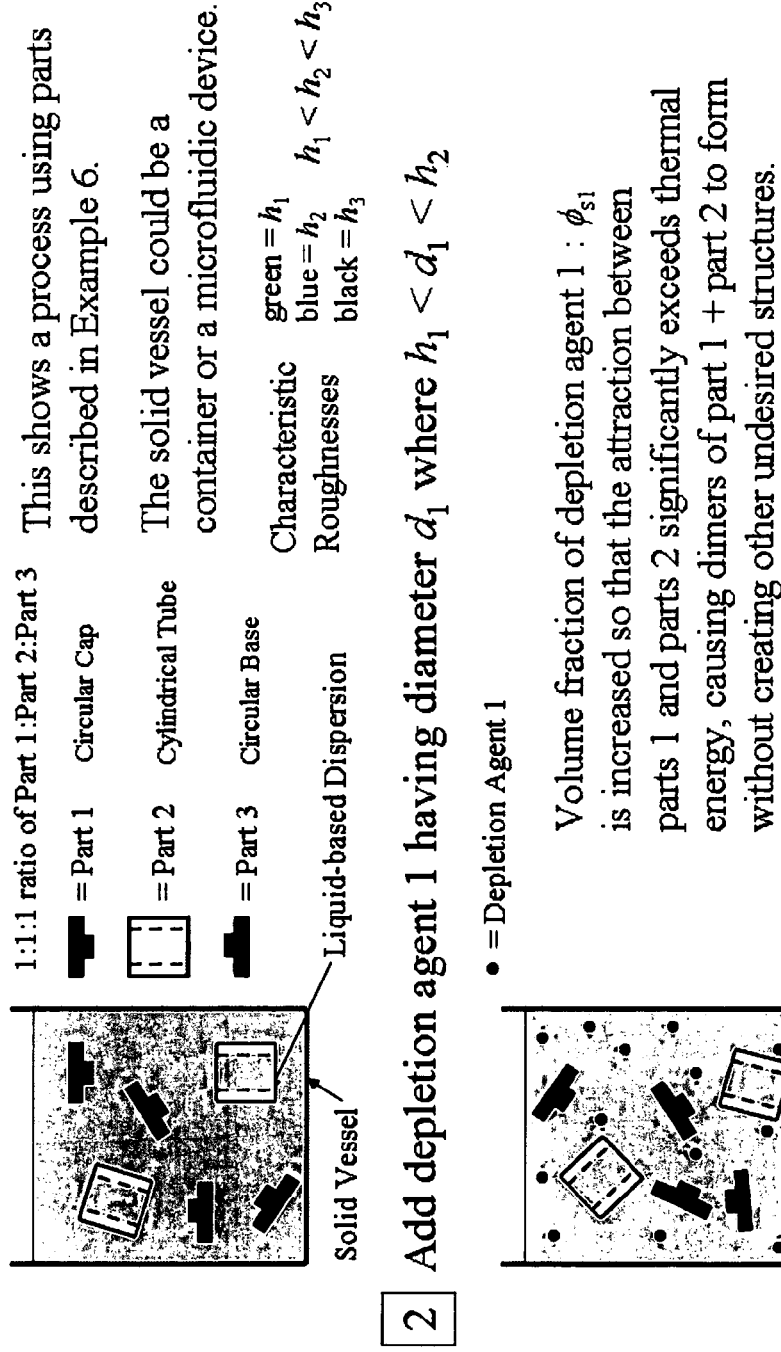

For laterally offset S-S surfaces, we allow one surface to move laterally by an amount ($\Delta X$, $\Delta Y$), and we also rotate one plate relative to another around its center by an angle $\theta_n$=n$\pi$/2, where n is an integer with n$\geq$0. This provides a means of examining the overlapping excluded volume when the two platelets only partially overlap, potentially reducing the importance of a few tall, spike-like asperities that can significantly reduce $V_e$ (see FIG. 17). By varying the amount of overlap and rotation to reduce the influence of the tallest asperities, it is possible for the depletion potential energy of laterally offset surfaces to become stronger than the depletion potential energy between aligned S-S surfaces. After lateral movement and rotation, the final $h^e_2$ surface is $h^e_2$(x',y'), where x'=x cos($\theta_n$)+y sin($\theta_n$)–$\Delta X$ and y'=y cos($\theta_n$)–x sin($\theta$n)–$\Delta Y$. Then, we calculate $U_n^{min}$ (d/h, $\Delta X$, $\Delta Y$, $\theta_n$) for each ($\Delta X$, $\Delta Y$, $\theta_n$). Since we only consider the lowest energy configuration, we choose the minimum value of $U_n^{min}$ (d/h, $\Delta X$, $\Delta Y$, $\theta_n$) for all possible ($\Delta X$, $\Delta Y$, $\theta_n$) and use that value to calculate $\phi_s$(d) for each contour line of U/($k_B$T).

Figures 4A, 4B, 4C, 4D:
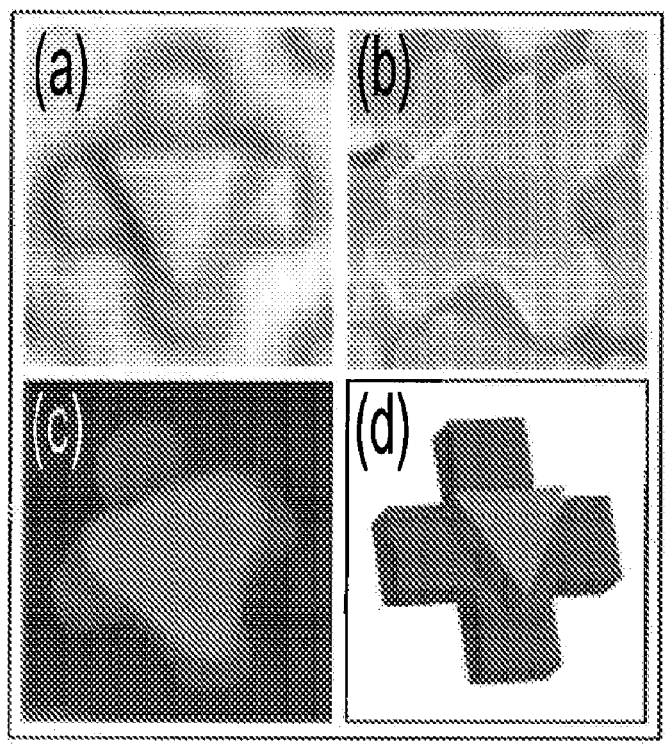
FIG. 4(a) Optical reflectance micrograph showing hybrid LithoParticle comprised of a triangle on top of a square cross.
FIG. 4(b) Scanning electron micrograph of the hybrid triangle-cross.
FIG. 4(c) Fluorescence micrograph of a triangle-cross showing blue emission from the cross and red emission from the triangle.
FIG. 4(d) Schematic 3-d representation of the hybrid triangle-cross LithoParticle.

By plotting the isoenergy contour lines for these four configurations on a single phase diagram after normalizing d by h, we obtain FIG. 4, corresponding to U/($k_B$T)=–6. We shade the regions between the boundaries of the isoenergy contours appropriately to correspond to the dominant configuration that would be observed at a particular $\phi_s$ and d/h. This provides a reasonable agreement with the phase diagram observed in experiments (see K. Zhao and T. G. Mason, Phys. Rev. Lett. 99, 268301 (2007)), including offset dimer and aligned dimer phases. Moreover, our calculations also show that two types of columnar phases can be present, one of which has no allowed R-R configurations. This microscopic difference in the types of columnar phases had not been noticed previously in experiments.

Using depletion attractions, one can build microbottles, for example, and trap nanoscale polymers inside them; such bottles might have potential microscopic drug delivery applications. Multilayer lithography using different masks can be used to create cups and caps (see FIG. 2 of Hernandez and Mason, J. Phys. Chem. C 111 4477-4480 (2007)). Beyond making simple bottles, one could make the bottles sensitive to their environment, so that they open, according to some embodiments of the current invention. While still on the wafer prior to liftoff, the exposed surface of the caps could be coated with a negatively charged sulfate groups. By contrast, the exposed rim of the cup could be treated with positively charged amine groups. Each of these components would be lifted off into separate solutions, and each would remain as a stable colloidal dispersion due to the repulsion of the similarly charged particles. However, when the two solutions are combined at very dilute volume fractions in the presence of the desired biological molecule, the caps would close on the cups, preventing the escape of the biomolecules from the bottles, thereby causing the directed mass assembly of a microdevice in solution. One use more biologically relevant closing agents, such as streptavidin and biotin, to close the bottles according to some embodiments of the current invention. Opening the bottles could then be triggered by the introduction of specific enzymes for cleaving these linkages or by pH. With microbottles based on this principle, it may be possible to deliver drugs microscopically to areas in the body that have an abundance of certain enzymes (e.g. caused by cancer) when these enzymes unwittingly open the microbottles. The biologically relevant closing agents could be added to a dispersion of container-like composite structures that have been formed through a process utilizing roughness-controlled depletion attractions. Once closed by biologically relevant closing molecules, such as proteins and nucleic acids, the depletion agents can be removed. The containers can be transferred intact to other solutions and will remain closed until biological activity (e.g. enzymatic activity) degrades the closing molecules, causing the containers to open and release their payload. Thus, this provides the potential for a drug-delivery vehicle that is a container which can be opened by the presence of certain biological molecules, chemical reactions, or through changes in at least one of temperature, ionic strength, and pH. The closing agents can also be degraded by light, thereby permitting light-controlled opening of the containers.

Moreover, by decorating particular sites on the component particles with different surface functionalities, one can make dispersions of multi-component particle assemblies with even greater specificity. This decoration can be done by patterning the surfaces of particles still on the wafer prior to lift off in either stepper-lithography approaches or templating approaches. These sites could be decorated with complimentary glue molecules (e.g. streptavidin and biotin), thereby forcing strong shear-rigid bonds in places that are desired. By contrast, aggregates formed by depletion attractions tend to maintain a lubricating layer of liquid between the parts, offering the flexibility of having devices with moving parts that nevertheless remain together. To rigidly fix the parts in place once the depletion attractions have organized them in a controlled manner, one can change the temperature, pH, or ionic strength to cause the particles to irreversibly aggregate (i.e. permanently bond) in the primary van der Waals attractive minimum. Alternatively, molecules such as polymers, polypeptides, and lipoproteins, or nanoparticles (e.g. which may have an opposite charge than the sign of the charge on the larger parts) could be added to the fluid to cause such irreversible aggregation or permanent bonding between the proximate surfaces.

The term "mating surface region" is intended to refer to a portion of a surface of an object that is suitable to be attracted to a portion of a surface of another object, referred to as its "complementary mating surface region," more strongly that surface regions of said particles that immediately surround the mating surface region and the complementary mating surface region. (See FIG. 5 for some examples. It is arbitrary which surface region is referred to as the "mating surface region" and the "complementary mating surface region." The terminology is intended to facilitate a description of pairs of surface regions that can be aggregated by depletion attraction.) The object that has the mating surface region and the object that has the complementary mating surface region may have substantially the same or different overall structures. For example, one could have a large plurality of objects that are all substantially the same in composition, shape, size, and surface structure. In such a case all of the plurality of objects will each have both a mating surface region and a complementary mating surface region. In some cases, the mating surface region may be on an object that has a different composition, shape, size, and/or surface structure than the object that has the complementary mating surface region. The mating surface region and the complementary mating surface region may be flat or curved. In an example in which the mating surface region and the complementary surface region are flat, the mating surface region can be substantially the same as the complementary surface region. In such a case, it is possible for a surface region of the object to serve as both a mating surface region and a complementary mating surface region. In another example, a mating surface region may have a convex curved shape, for example, and the complementary mating surface region has a concave curved shape so that the mating surface region and the complementary mating surface region can be arranged either in contact with each other or in close proximity with a thin layer of material between them. For example, in one embodiment, such a curved surface may have a structure that permits essentially all of at least one of the curved surfaces to be arranged in close proximity to the other curved surface. One can see that there are a large number of possible variations of designing, or otherwise obtaining, mating and complementary mating surface regions such that they provide desired depletion attractions to each other in fluids having selected dispersions of smaller objects therein, thereby permitting one to selectively control the production of composite structures, in parallel, that can each have many components. In addition, other portions of the surfaces of the objects (other than the mating surface regions and complementary mating surface regions) can be designed with edges, depressions, incompatible curvatures, or protrusions and the like to inhibit mating there. These inhibiting features can also be used in combination with mating surface features to also force a pre-specified alignment of the objects that have aggregated together at the mating and complementary mating surface regions.

Bigger particles typically have to experience significant rearrangements and explore many different configurations so that they can approach one another in a wide variety of relative positions and orientations so that the desired mating configuration can be found in a reasonable period of time. Thermally driven diffusion (Brownian motion) can enable this for smaller particles according to an embodiment of the current invention, but other forms of stirring or mechanical agitation might also be used to make this happen according to other embodiments of the current invention.

The repulsive part of the interaction potential between the surfaces of the larger particles should not be so long in range that it would preclude the approach of the mating surfaces at distances that are comparable to or smaller than the size of the depletion agent. Yet, some repulsion is needed to prevent aggregation of these larger components without the depletion agent. For example, bigger particles can have a short-range surface repulsion that has a range that is comparable to or smaller than the size of the depletion agent according to an embodiment of the current invention.

There can be one or more than one kind of depletion agent according to some embodiments of the current invention. For example, one can add depletion agents of different sizes to control the depletion attraction and the aggregation processes according to some embodiments of the current invention. Depletion agents can be micelles, nanoparticles, nanodroplets, polymers, vesicles, quantum dots, colloidal particles, biopolymers, bio-colloids, and the like, according to some embodiments of the current invention. Depletion agents do not have to be spherical objects, and they can by facetted nanocrystals or even rod-like nanoparticles or micelles. The size distribution of a spherical depletion agent can be characterized simply in terms of a probability distribution of diameters. For uniform monomodal size distributions of a spherical depletion agent, an ensemble-average diameter is sufficient to characterize the average size of the depletion agent. However, for non-spherical depletion agents, the characterization of the size distributions can be more complex. For simplicity, the size distribution of such non-spherical depletion agents can be characterized by a probability distribution of a maximum dimension. The range and strength of a depletion attraction can depend considerably on the shape of the depletion agent, but, in some instances, the depletion attraction of a distribution of a maximum dimension for non-spherical objects can be roughly estimated by comparison with a similar distribution of diameters of spheres. For convenience, we will also refer to depletion agents as comprising a plurality of "particles." However, particles of the depletion agents are not restricted to only solid structures. "Particles" in this context is intended to include any of the above-noted examples.

In some embodiments of the current invention, it can be advantageous to introduce depletion agents that have a highly uniform and narrow size distribution. Such distributions are often referred to as monodisperse, since the width of the distribution divided by the average of the distribution is small. For instance, a wide variety of monodisperse dispersions of polymer or inorganic nanospheres and nanodroplets are readily available for use as depletion agents. Uniform nanorods or other non-spherical particles are also available. The use of monodisperse depletion agents for roughness-controlled depletion attractions can facilitate multi-step assembly because the greater uniformity permits finer control of the ratio of the average maximum dimension of the size distribution of the depletion agent relative to the average height of the height distribution of the surface structural features on the objects to be assembled. It can be desirable in some instances to introduce a first uniform depletion agent with a smaller average maximum dimension to achieve a first step in an assembly process between smoother surfaces on the objects (e.g. to create two-object composite structures) and then introduce a second uniform depletion agent with a larger average maximum dimension to achieve a second step in an assembly process between rougher surfaces on the objects. By extending this approach, many steps of assembly can be achieved.

The plurality of objects that are being aggregated together to make composite structures can be, according to some embodiments of the current invention, particles made using at least one of the following methods related to lithography: an optical lithography exposure device, a mask aligner, an optical stepper, a deep ultraviolet stepper, an ultraviolet stepper, a step-and-flash exposure system, a step-and-scan exposure system, an electron beam lithography exposure device, an ion beam exposure device, a laser exposure device, a sputterer, a reactive ion etcher, a deep reactive ion etcher, a plasma, a developer, a spin-coater, an electron beam deposition system, physical vapor deposition, chemical vapor deposition, mechanical imprinting, stamping, extrusion, injection molding, nanoimprint lithography, mechanical cutting, mechanical toming, microlens arrays, continuous flow lithography, stop flow lithography, dip-pen lithography, and holographic optical exposure.

The plurality of objects that are being aggregated together to make composite structures can be, according to some embodiments of the current invention, microscale or nanoscale particles made lithographically using at least one of: spatially patterned radiation, mechanical imprinting, stamping, nanoimprinting, step-and-flash nanoimprinting, dip-pen lithography, relief deposition templating.

The verb "aggregate" when used in the context of attractive interactions between two proximate objects created by depletion attractions refers to the creation of an attractive interaction energy between the complementary mating surface regions of said two proximate objects that is substantially stronger than thermal energy, $k_B T$, where $k_B$ is Boltzmann's constant and T is the temperature. In most cases, a thin layer of lubricating fluid of the continuous phase will continue to remain between the complementary mating surface regions even after two objects "aggregate" by a depletion attraction. By adjusting the size and volume fraction of the smaller depletion agent, it is frequently possible to make the attractive interaction energy between complementary mating surfaces many times $k_B T$ so that once larger objects aggregate together, they do not later become un-aggregated if the concentration of the depletion agent is not altered. If reducing or eliminating the concentration of the depletion agent is desired after forming a composite structure of aggregated objects, then it may be necessary to permanently connect, fuse together, permanently attach, directly contact, or irreversibly bond the complementary mating surfaces of the objects according to some embodiments of the current invention.

After a stage in the assembly of the desired composite structure occurs, one can permanently and irreversibly bond attracted surfaces of particles together through a thermal process, a chemical process, a reaction, an irreversible bonding, an acoustic process, or a pressure process in some embodiments of the current invention. In referring to this process of permanently bonding or connecting a portion of the nearby surfaces of two proximate neighboring larger objects together irreversibly, we say the larger objects "irreversibly bond together" or "irreversibly aggregate" to distinguish this process from the one in which we only use the sole word "aggregate" to refer to the process by which portions of the surfaces of larger objects are attracted together by a depletion attraction. However, the general aspects of the invention are not limited to only permanently and irreversibly bonding components of the composite structures. For example, other embodiments may allow components of the composite structures to remain separated by a layer of the continuous liquid phase or an anti-clumping material between them which can act as a lubricating layer in some embodiments. This can be useful to form a composite structure having moving parts.

The differences between slippery bonding and shear rigid bonding can be important in determining the internal degrees of freedom within a composite structure (C. R. Seager and T. G. Mason, Phys. Rev. E, 75 011406 (2007)). A slippery bond can refer to an attractive interaction between the surfaces of two particles for which there is a deep attractive secondary potential well (as a function of separation between the surfaces) relative to thermal energy, but also a strong repulsion at even shorter range than the minimum in the potential well. This extremely short range repulsion prevents the two solid surfaces of the proximate particles from touching so a lubricating layer of fluid remains between them. In practice, it is possible to form a slippery bond between two particles that has only a few nanometers of liquid that separates the surfaces of the particles. In many cases, charge on the particles' surfaces can provide the extremely short-range repulsion. By adding salt or varying the pH of the fluid, it can be possible to reduce this extremely short range repulsion enough that thermal energy can cause fluctuations that overcome the repulsion and thereby transform the slippery bond into a shear-rigid bond through solid-solid contact of the particles in their primary minimum of potential interaction. Typically, such solid-solid contact leads to permanent shear-rigid bonding that is irreversible.

Composite structures made from only shear-rigid bonds do not have internal degrees of freedom because all internal particle-components are rigidly locked in place. By contrast, composite structures that incorporate slippery bonding between particle-components can have functionality as hinges, linkages, machines, and other devices that have moving parts.

The term "clumping" when used in the context of describing the positional structure of larger objects, refers to non-specific aggregation of the larger objects into aggregate structures, or "clumps", that are typically undesirable and do not have the organization of the desired composite structures. If the larger objects are not properly stabilized in the fluid, then clumping can occur by a variety of types of attractive interactions other than a depletion attraction prior to the introduction of any depletion agent. To prevent clumping, the surfaces of the larger objects can be modified with a stabilizing agent that provides a very short-range repulsion between the surfaces of the objects. Typically, this repulsive interaction is shorter in range or at most comparable to the size of the depletion agent that is introduced to create a depletion attraction. Once treated, the stabilizing agent that modified the surfaces of the objects can be removed and the objects will remain stably dispersed in the fluid even after the stabilizing agent is subsequently removed from the fluid. Another method of precluding clumping involves adding anti-clumping agents to the fluid prior to dispersing the larger objects in it. It is possible to choose an anti-clumping agent that acts to stabilize the dispersion of larger objects against clumping without interfering in an undesirable manner with the depletion attraction created by the subsequent addition of the depletion agent.

As noted above, in some embodiments there may be no need for an anti-clumping agent to be introduced into the fluid, such as when stabilizing charge groups are present on or have been chemically bonded to the particles' surfaces. This pre-treatment of the particles to inhibit clumping without introducing an anti-clumping agent can be a preferred method in some embodiments of the current invention. Methods of surface modification of particles can include: functionalizing, grafting, covalently bonding, adsorbing, coating, ionically bonding, and encapsulating with materials such as a polymer, a co-polymer, a graft co-polymer, a surface-active nanoparticle, a lipid, an amphiphilic molecule, a biomolecule, a derivatized biomolecule, a polyanion, a protein, a capsid protein, a polypeptide, a co-polypeptide, a nucleic acid, a single-stranded deoxyribonucleic acid, a double-stranded deoxyribonucleic acid, a ribonucleic acid, a polyethylene glycol, an albumin, and an oligomer of a nucleic acid.

The whole system, including the fluid, objects for assembly, depletion agents and anti-clumping agents, can be rotated to prevent gravity-driven separation through sedimentation or creaming as the composite structures become larger in some embodiments of the current invention. Moreover, non-thermal excitations, such as applied fluid flows or external electromagnetic fields, can be introduced to cause the objects to move, reorient, and become proximate to one another until a favorable configuration occurs that leads to slippery or permanent bonding. If the component objects and/or composite structures are sufficiently small, thermal energy alone may be sufficient to keep them dispersed in the fluid through Brownian motion and thereby passively facilitate the sampling of different relative particle configurations that can provide for sufficiently strong depletion attractions that lead to bonding of component objects or composite structures.

According to some embodiments of the current invention, a plurality of composite structures can be mass-produced with a defect rate (error rate) in the production of less than about ten percent and typically less than about one percent.

Also, one or more sets of objects may be dispersed in excess in the fluid according to some embodiments of the current invention so that the number of composite structures produced can be limited by the number of only one species of larger components. Furthermore, composite structures can be produced from objects that are assembled in a predetermined order through portions of mating surface regions of two or more larger objects.

It can be desirable to control the order of addition of the larger components to a fluid containing the composite structures and depletion agents in order to cause a particular desired assembly to form. By controlling the order of availability of a larger component that may provide a different strength of the depletion attraction when interacting with another larger component or a composite structure, it is possible to uniquely determine the placement of the bonding of the newly introduced larger component. By sequencing the addition of larger components and the addition of depletion agents having particular sizes and concentrations to the dispersion of partially assembled composite structures, it is possible to create many distinct stages of aggregation that can cause larger component parts to be assembled in desired positions and orientations on desired composite structures without generating significant numbers of undesired component structures.

The ratios of the volume fractions of different types of larger objects in the fluid can be adjusted to provide an appropriate stoichiometry of objects that have complementary mating surface regions that will yield a predetermined desired ratio of one or more composite structures as products. Subsequently, adding the smaller objects as a depletion agent that induces the aggregation of the larger objects through a depletion attraction, can cause the composite structures to form in a desired ratio. Exact matching of the volume fractions of specific types of larger objects can be desirable if there is a one-to-one correspondence in the complementary mating surface regions between such larger objects. In other embodiments of the present invention, a two-to-one ratio of the volume fraction of the different types of larger objects, or even larger ratios or fractional ratios, can be desirable.

The time required to form the composite structures at an acceptably low error rate of less than about ten percent, and typically less than one percent, according to some embodiments of the current invention are governed largely by the viscosity of the fluid material in which all of the objects are dispersed and the size and the volume fraction of the larger objects. Using a low viscosity fluid is frequently desirable because the translational, and rotational diffusion rates of the larger objects are faster, enabling them to encounter each other in a range of positions and orientations that provide at least a partial overlap of portions of the complementary mating surface regions on different objects. A partial overlap of portions of the complementary mating surface regions is often sufficient to create a strong enough depletion attraction energy compared to thermal energy that the mating surface regions will remain in close proximity and can then rapidly find a configuration in which the depletion attraction between the mating surface regions is maximized. For microscale objects dispersed in water at a volume fraction of 0.001, typically a few minutes to a few hours is required to mass produce many copies of the desired composite structure in the water. It is sometimes desirable to use reduced volume fractions of objects even below 0.001, although the times for the plurality of desired composite structures to form with an acceptably low level of errors may be many hours, days, or even weeks. For thermalized dispersions, simplistic calculations of doubling times of diffusion-limited cluster aggregation of spherical particles can provide rough estimates for the time scales required for a particular stage in the assembly (Russel, W. B.; Saville, D. A.; Schowalter, W. R. *Colloidal Dispersions; Cambridge Univ. Press: Cambridge*, 1989). The time scales for non-spherical particles attracted together by roughness-controlled depletion attractions could be longer due to orientational considerations.

By analogy to reactions of smaller building blocks into larger molecular species in chemistry, it is possible and sometimes desirable to simultaneously form several different composite structures of objects that represent some or all possible isomers of a general composite structure, rather than one unique composite structure after the depletion agent is added to the fluid. Roughness-controlled depletion attractions can be used to cause component objects to assemble into a variety of composite structures after the depletion agent is introduced.

The invention has been described in detail with respect to various embodiments, and it will now be apparent from the foregoing to those skilled in the art that changes and modifications may be made without departing from the invention in its broader aspects, and the invention, therefore, as defined in the claims is intended to cover all such changes and modifications as fall within the general concept of the invention.

We claim:

1. A method of assembling a composite structure from objects in a fluid, comprising:

providing a plurality of objects, each object of said plurality of objects having a preselected size, a preselected shape, and a preselected spatial distribution of surface structural features characterizing a surface roughness;

dispersing said plurality of objects into said fluid; and introducing a depletion agent into said fluid, said depletion agent comprising a plurality of particles having a size distribution preselected to cause an attractive force arising from a depletion attraction between at least a first object and a second object of said plurality of objects in at least one relative position and orientation based on said preselected spatial distribution of surface structural features on said first and second objects, wherein said depletion attraction between said first and second objects forms at least one of a rigid bond or a slippery bond at or proximate to respective surface portions based on said preselected spatial distribution of surface structural features on said first and second objects to form a two-object composite structure.

2. A method of assembling a composite structure according to claim 1, wherein said fluid is one of a liquid, a gas, a supercritical fluid, a thermotropic liquid crystal, a lyotropic liquid crystal, a polymer solution, a micellar solution, an emulsion, a foam, a miscible liquid mixture, a biological buffer solution, a biological liquid, a glassy material, a ferrofluid, a basic solution, an acidic solution, a viscoelastic fluid, and a non-Newtonian fluid.

3. A method of assembling a composite structure according to claim 1, wherein a maximum dimension of said surface structural features on said first object is less than a maximum dimension of said first object, and wherein a maximum dimension of said surface structural features on said second object is less than a maximum dimension of said second object.

4. A method of assembling composite structures according to claim 1, further comprising increasing a temperature of said fluid after said introducing said depletion agent into said fluid to cause an ensemble average size of said plurality of particles of said depletion agent to increase to thereby cause an increase of said depletion attraction.

5. A method of assembling a composite structure according to claim 1, wherein said plurality of particles of said depletion agent are at least one of micelles, nanoparticles, nanospheres, nanorods, nanocubes, nanodroplets, nanoemulsions, polymers, dendrimers, asphaltenes, fullerenes, viruses, organelles, vesicles, quantum dots, colloidal particles, biopolymers, bio-colloids, and nanocrystals.

6. A method of assembling composite structures according to claim 1, further comprising dispersing a second plurality of objects into said fluid, each object of said second plurality of objects having a preselected spatial distribution of surface structural features characterizing a surface roughness,
  wherein said plurality of particles of said depletion agent cause a depletion attraction between at least a first object of said second plurality of objects and said two-object composite structure in at least one relative position and orientation based on said preselected spatial distribution of surface structural features,
  wherein said first object of said second plurality of objects and said two-object composite structure form at least one of a rigid bond or a slippery bond at or proximate to respective surface portions based on said preselected spatial distributions of surface structural features to form a three-object composite structure.

7. A method of assembling a composite structure according to claim 1, further comprising causing each of said plurality of objects in said fluid to translate and rotate as a result of dispersive forces acting on each of said plurality of objects in said fluid,
  wherein said attractive force associated with said depletion attraction between at least said first object and said second object is stronger than said dispersive forces.

8. A method of assembling a composite structure according to claim 7, wherein said dispersive forces are thermal forces.

9. A method of assembling a composite structure according to claim 7, wherein said dispersive forces are thermal forces and said plurality of objects have a maximum dimension that is less than 10 microns so that said thermal forces cause said plurality of objects to translate and rotate to cause them to assume a variety of different relative configurations of position and orientation so that a configuration that has a sufficiently strong depletion attraction to form said at least one of said rigid bond or said slippery bond is obtained.

10. A method of assembling a composite structure according to claim 7, wherein an ensemble-average maximum dimension of said size distribution of said depletion agent is greater than an ensemble-average maximum dimension associated with said surface structural features on said first and second objects.

11. A method of assembling a composite structure according to claim 7, wherein said dispersive forces are non-thermal forces comprised of at least one of viscous forces, inertial forces, gravitational forces, electromagnetic forces, magnetic forces, optical forces, vibrational forces, and turbulent fluid forces.

12. A method of assembling composite structures according to claim 1, further comprising producing said plurality of objects prior to said dispersing them in said fluid, wherein said producing includes producing said preselected spatial distribution of surface structural features characterizing said surface roughness.

13. A method of assembling composite structures according to claim 12, wherein said plurality of objects are particles created lithographically.

14. A method of assembling composite structures according to claim 12, wherein said spatial distribution of surface structural features further comprises one or more predefined surface regions of substantially uniform surface roughness.

15. A method of assembling composite structures according to claim 12, wherein said producing said preselected spatial distribution of surface structural features characterizing said surface roughness of said plurality of objects comprises at least one of a deposition, an etching, an ablation, an interferometric patterning, a holographic patterning, a lithographic patterning, a surface growth, an epitaxial growth, an adsorption, a desorption, a dissolution, a plating, a stripping, a degradation, a chemical development, a plasma exposure, an oxidation, a reduction, a grafting, a polishing, a melting, a solidification, a freezing, a chemical reaction, an electrochemical reaction, a covalent bonding, an ionic bonding, a surface bonding, a surface nucleation reaction, a nanoparticulate aggregation, an irradiation, a polymerization, a coating reaction, a surface assembling, a surface treatment, a spin coating, a fracturing, a milling, a particulate blasting, a texturing, a Langmuir-Blodgett film coating, a sol-gel coating, and a painting.

16. A method of assembling composite structures according to claim 1, further comprising increasing a temperature of said fluid after said introducing said depletion agent into said fluid to cause said ensemble average size of said particles of said depletion agent to increase to cause a depletion attraction between at least a third object and said two-object composite structure in at least one relative position and orientation based on said preselected spatial distribution of surface structural features characterizing said surface roughness,
  wherein said third object and said two-object composite structure form at least one of a rigid bond or a slippery bond at or proximate to respective surface portions based on said preselected spatial distribution of surface structural features to form a three-object composite structure.

17. A method of assembling composite structures according to claim 16, wherein said particles of said depletion agent are micelles.

18. A method of assembling composite structures according to claim 1, further comprising introducing a second depletion agent into said fluid, said second depletion agent comprising a second plurality of particles having a second size distribution preselected to cause a depletion attraction between at least a third object of said plurality of objects and said two-object composite structure in at least one relative position and orientation based on said preselected spatial distribution of surface structural features,
    wherein said third object of said plurality of objects and said two-object composite structure form at least one of a rigid bond or a slippery bond at or proximate to respective surface portions based on said preselected spatial distribution of surface structural features, thereby forming a three-object composite structure.

19. A method of assembling composite structures according to claim 18, wherein said second size distribution of said plurality of particles of said second depletion agent has an ensemble-average maximum dimension that is larger than an ensemble-average maximum dimension of the first-mention size distribution of said plurality of particles of the first-mention depletion agent.

20. Composite structures assembled according to any one of claims 1-6.

21. A system for producing composite structures from objects dispersed in a fluid, comprising:

a supply of a plurality of objects to be dispersed into said fluid, each object of said plurality of objects having a preselected spatial distribution of surface structural features characterizing a surface roughness;

a supply of a depletion agent to be introduced into said fluid, said depletion agent comprising a plurality of particles having a size distribution preselected to cause depletion attraction between at least a first object and a second object of said plurality of objects in an orientation based on said preselected spatial distribution of surface structural features, wherein said first and second objects form at least one of a rigid bond or a slippery bond at or proximate to respective surface portions based on said preselected spatial distribution of surface structural features to form a two-object composite structure.

22. A system for producing composite structures according to claim 21, further comprising an object production system, wherein said object production system is constructed to produce said supply of said plurality of objects to be mixed into said fluid.

* * * * *